United States Patent
Smith et al.

(10) Patent No.: US 11,632,539 B2
(45) Date of Patent: Apr. 18, 2023

(54) SYSTEMS AND METHODS FOR INDICATING A FIELD OF VIEW

(71) Applicant: Axon Enterprise, Inc., Scottsdale, AZ (US)

(72) Inventors: Patrick W. Smith, Scottsdale, AZ (US); Nache D. Shekarri, Scottsdale, AZ (US); William J. Soper, Bristol (GB); Todd F. Basche, Los Altos, CA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/025,398

(22) Filed: Sep. 18, 2020

(65) Prior Publication Data
US 2021/0006772 A1 Jan. 7, 2021

Related U.S. Application Data

(63) Continuation of application No. 15/889,787, filed on Feb. 6, 2018, now abandoned.
(Continued)

(51) Int. Cl.
*H04N 13/282* (2018.01)
*H04N 5/232* (2006.01)
(Continued)

(52) U.S. Cl.
CPC ......... *H04N 13/282* (2018.05); *H04N 5/2251* (2013.01); *H04N 5/23238* (2013.01); *H04N 13/239* (2018.05); *H04N 2013/0088* (2013.01)

(58) Field of Classification Search
CPC ............... H04N 13/239; H04N 13/282; H04N 2013/0088; H04N 5/2251; H04N 5/23238
See application file for complete search history.

(56) References Cited

U.S. PATENT DOCUMENTS

| 8,791,983 B2 | 7/2014 | Shikata |
| 9,152,019 B2 | 10/2015 | Kintner |

(Continued)

FOREIGN PATENT DOCUMENTS

| CN | 103200352 | 7/2013 |
| WO | 2013059850 | 5/2013 |

OTHER PUBLICATIONS

International Searching Authority, International Search Report for the International Patent Application No. PCT/US2018/017053 dated May 14, 2018.

(Continued)

*Primary Examiner* — Kathleen V Nguyen
(74) *Attorney, Agent, or Firm* — Carmel Zhao; Andrew Graham

(57) ABSTRACT

A system for determining a person's field of view with respect to captured data (e.g., recorded audiovisual data). A multi-camera capture system (e.g. bodycam, vehicular camera, stereoscopic, 360-degree captures system) records audiovisual data of an event. The field of capture of a capture system or a field of capture of captured data combined from multiple capture systems may be greater than the field of view of a person. Facial features (e.g. eyes, ears, nose, and jawlines) of the person may be detected from the captured data. Facial features may be used to determine the field of view of the person with respect to the captured data. Sensors that detect head orientation may be used to determine the field of view of the person with respect to captured data. The field of view of the person may be shown with respect to the captured data when the captured data is played back.

20 Claims, 15 Drawing Sheets

Related U.S. Application Data

(60) Provisional application No. 62/473,649, filed on Mar. 20, 2017, provisional application No. 62/458,947, filed on Feb. 14, 2017.

(51) Int. Cl.
  *H04N 5/225* (2006.01)
  *H04N 13/239* (2018.01)
  *H04N 13/00* (2018.01)

(56) References Cited

U.S. PATENT DOCUMENTS

| | | |
|---|---|---|
| 10,008,124 B1 | 6/2018 | Holst |
| 2003/0133008 A1 | 7/2003 | Stephenson |
| 2007/0024701 A1 | 2/2007 | Prechtl |
| 2008/0002262 A1* | 1/2008 | Chirieleison ...... G02B 27/0093 359/630 |
| 2008/0068187 A1 | 3/2008 | Bonefas |
| 2012/0229614 A1* | 9/2012 | Jacobs .................. G01C 21/20 348/62 |
| 2013/0069985 A1 | 3/2013 | Wong |
| 2014/0009503 A1 | 1/2014 | Gorstan |
| 2014/0139621 A1 | 5/2014 | Shinozaki |
| 2014/0184801 A1* | 7/2014 | Choi ..................... G06V 10/25 348/158 |
| 2015/0146078 A1* | 5/2015 | Aarrestad .......... H04N 5/23299 348/345 |
| 2015/0201181 A1 | 7/2015 | Moore et al. |
| 2016/0026240 A1* | 1/2016 | Wexler .................... G06F 3/005 348/207.11 |
| 2016/0073023 A1 | 3/2016 | Rondinelli |
| 2016/0191796 A1 | 6/2016 | Mate |
| 2016/0309808 A1 | 10/2016 | Armour |
| 2016/0337630 A1* | 11/2016 | Raghoebardajal ... H04N 13/128 |
| 2016/0360146 A1 | 12/2016 | Smith |
| 2017/0032787 A1 | 2/2017 | Dayal |
| 2017/0230585 A1* | 8/2017 | Nash ......................... G06T 5/50 |
| 2017/0244951 A1* | 8/2017 | Ha ....................... H04N 13/111 |
| 2018/0045491 A1 | 2/2018 | Heroor |
| 2018/0096461 A1* | 4/2018 | Okayama .................. G06T 7/10 |
| 2018/0101989 A1 | 4/2018 | Frueh |
| 2018/0267301 A1 | 9/2018 | Holst |

OTHER PUBLICATIONS

USPTO, Non-Final Office Action for U.S. Appl. No. 15/889,787 dated Feb. 7, 2019.
USPTO, Final Office Action for U.S. Appl. No. 15/889,787 dated Aug. 9, 2019.
USPTO, Non-Final Office Action for U.S. Appl. No. 15/889,787 dated Nov. 29, 2019.
USPTO, Final Office Action for U.S. Appl. No. 15/889,787 dated Jun. 19, 2020.

* cited by examiner

SYSTEMS AND METHODS FOR INDICATING A FIELD OF VIEW

FIELD OF INVENTION

Embodiments of the present invention relate to detecting a person's field of view with respect to recorded data.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF INVENTION

Police officers use video cameras (i.e. bodycams, vehicular cameras, stereoscopic cameras, 360-degree cameras, infrared cameras) to record the events that occur at an incident. Cameras are capable of recording a larger field of view than a human may see. For example, a capture system that includes cameras may be capable of recording a field of view of up to 360 degrees. The field of view of a camera and/or a capture system is referred to herein as the field of capture whereas the field of view of a human is referred to as field of view.

Video recordings from multiple cameras may be combined (e.g., aligned) to present a larger field of capture than can be seen by a person at any one time, such that portions of the recorded data are within or outside the person's field of view at any one time. Information regarding what a person could see prior to weapon discharge or a use of force may be important when determining whether the use of force was justified or within regulations.

Body cameras attached to the chest of an officer are presently available and widely deployed. Cameras or capture systems may include 360-degree field of capture, for example, capture system 112 of FIG. 1 which is attached to drone 110 that captures a 360-degree field of capture of the area around an incident.

Many capture systems presently used by police use a single camera or a camera with a single sensor that captures data along a single axis and provides a single field of capture that has a single viewpoint. A capture system for capturing data of an incident may benefit from using multiple cameras positioned along different axes (e.g., stereoscopic capture system). One or more camera axes of a stereoscopic system may overlap to provide a wider view of a scene than a single axis camera. A stereoscopic camera provides advantages over single-axis cameras. For example, the captured data from stereoscopic cameras may provide information for calculating the distance from the cameras to objects in view. Distance information may be transmitted to the CEW to improve electrode spacing when targeting.

In an implementation discussed herein, a stereoscopic system may benefit from having a support that enables the cameras to be positioned on or around the neck and/or shoulders of the user. Positioning cameras on the shoulders of a user, as opposed to on the chest of the user, enables the cameras to capture data from a perspective that may be more relevant.

Figure 7:
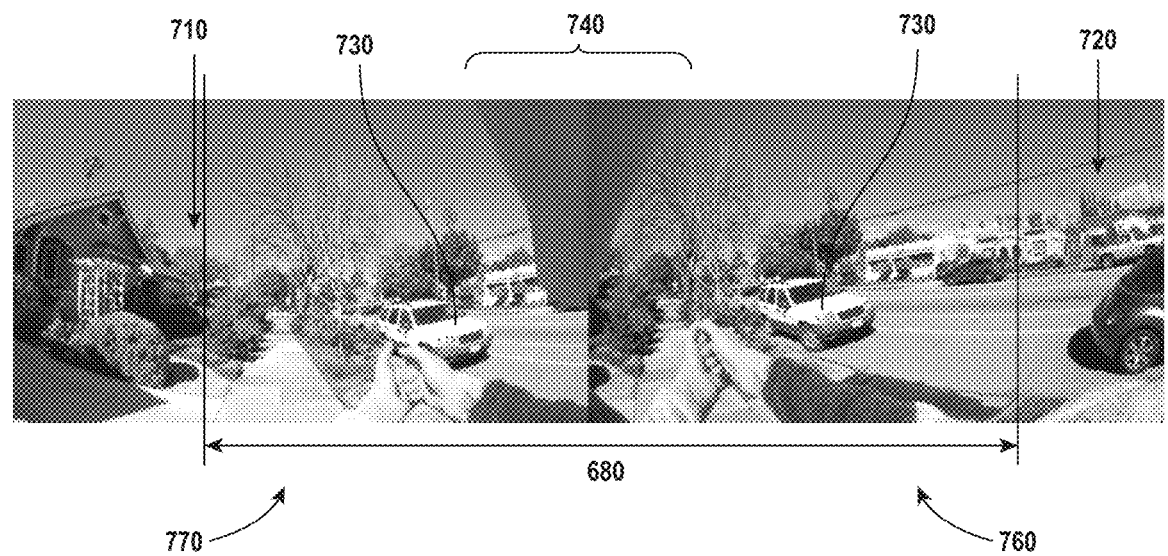
FIG. 7 is a frame of video data captured of a location by the cameras of the system of FIG. 4.

Even a single axis camera may record a field of capture that is greater than the human field of view. See for example FIG. 8 for an image captured by a chest mounted camera. The recorded field of capture may be greater than the user's field of view. However, as shown in FIG. 7, a stereoscopic, shoulder-mounted system may record a field of capture which is wider than the field of view for the single axis camera or the user.

Figure 1:
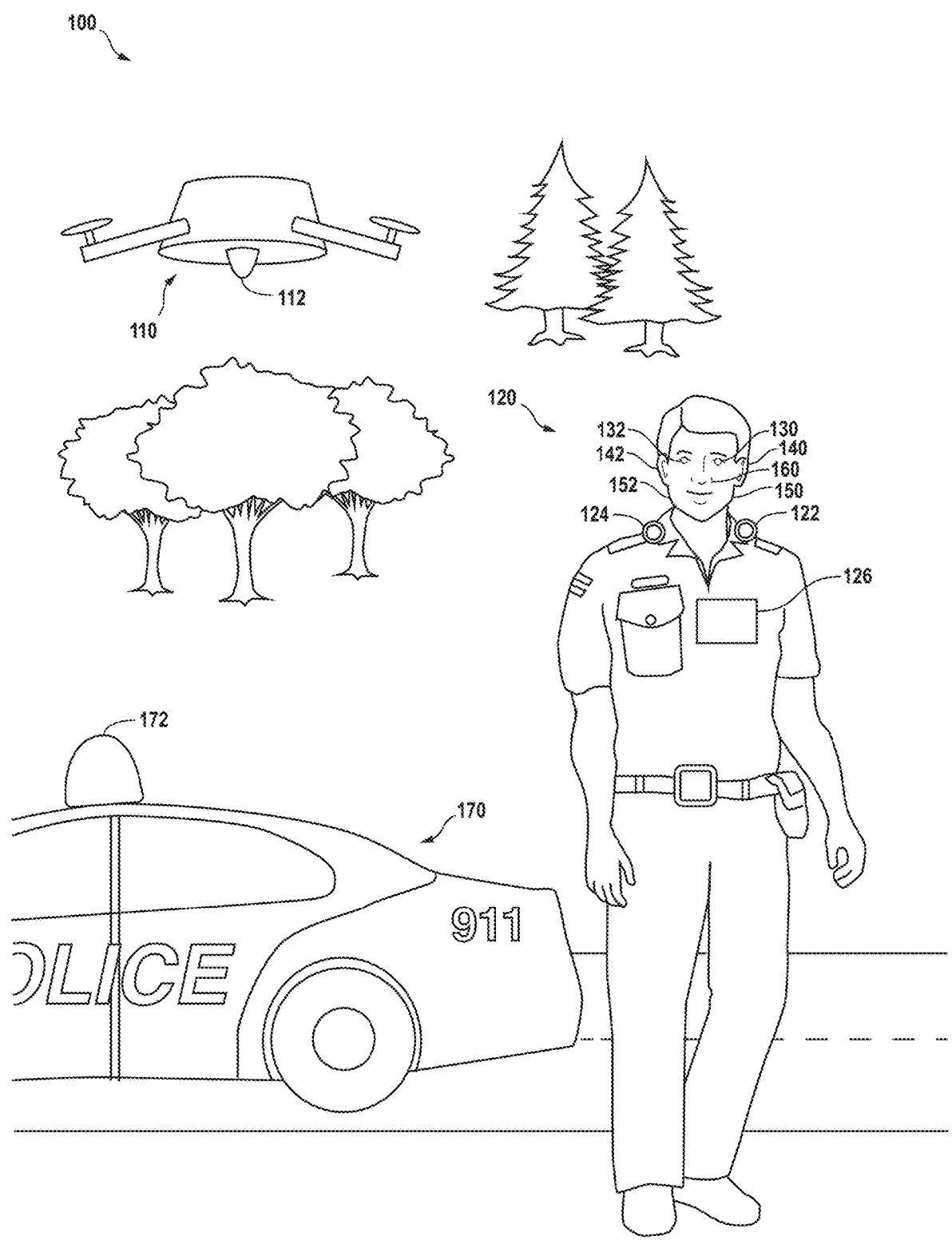
FIG. 1 is a diagram of a system for capturing audiovisual information according to various aspects of the present disclosure.

Scene 100 of an incident, in FIG. 1, shows multiple capture systems 112, 122, 124, 126 and 172 which capture audio and visual information. Capture system 126 and capture systems 122 and 124 are mounted on officer 120. Capture systems 122 and 124 may cooperate with each other to provide stereoscopic data. Capture system 172 is mounted on vehicle 170. Capture system 112 is a 360-degree capture system mounted on drone 110. Any or all of the capture systems may record a field of capture of scene 100 of up to 360 degrees. Any or all capture systems may have a field of capture greater than the field of view of officer 120. Further, a capture system may capture information in a range of light that is not visible to humans, such as in the infrared band.

Because the field of capture of any one capture system or the combine fields of capture of two or more of the capture systems after alignment may be greater than the field of view of officer 120, it may be desirable to determine the portion of the field of capture that officer 120 could have seen at any time. The field of view of an average human may be determined from their facial features (i.e. eyes, ears, nose, and jawlines). The term field of view, as used herein, refers to the direction in which a person is looking and the portion of a scene that the person can see in that direction. Portions of a scene that lay outside of a person's vision (e.g., past peripheral vision wherein in a vertical or horizontal direction) are not within the field of view of the person. Facial features may be identifiable from data captured by one or more of the capture systems. Facial features may also be referred to as facial anatomy.

Facial features of interest include eyes 130 and 132, ears 140 and 142, nose 160, and jawlines 150 and 152. Facial features may be used to determine the direction of view and the field of view of a person. Facial features of a person recorded in captured information may be used to determine which portion of the field of capture fell within the field of view of the person at the location where the information was captured.

Sensors may also be used to determine the field of view of a user. Sensors located on the head or face of a user may determine the head orientation of the user. Sensors may be used in place of or in addition to facial features to determine the field of view of a user. Sensors may include a head mounted laser whose beam and point of illumination may be recorded by a camera. Sensors may include directional microphones to detect a user's breathing and/or voice to provide data regarding head orientation and field of view. Sensors may be located on or in a shoulder or neck mount to detect physical forces (e.g., twist, strain, stress) indicative of a user turning their head.

A system, such as system 1800, may be used to capture audiovisual data at the scene of an incident, store the data, align the audiovisual data captured by the various capture systems, determine a field of view of a person from captured data or sensor data, and present (e.g., display, identify) the field of view of the person with respect to the captured data from one or more capture systems. The system may identify landmarks or common features and align videos from different captures systems by aligning landmarks or commonly captured features. A field of view of a user may be identified in captured data as a portion of the captured data. The portion of the captured data that corresponds to the field of view of a user may be identified by a boundary (e.g., line, geometric shape, rectangle) around the portion of the captured data. A field of view may be shown with respect to captured data, from one or more capture systems, as the captured data is replayed for viewing.

Capture systems that include multiple cameras positioned along different axes may include two cameras facing forward, with respect to the user, and one camera behind. In another implementation, one camera may capture data in black and white while the other camera may capture data in color. Cameras of different types may permit capturing data in different environmental conditions. In another implementation, multiple capture systems may include multiple microphones. Multiple microphones in known position relative to each other (e.g., via a shoulder support) may enable the origin of a sound, relative to the user, to be determined.

Figure 2:
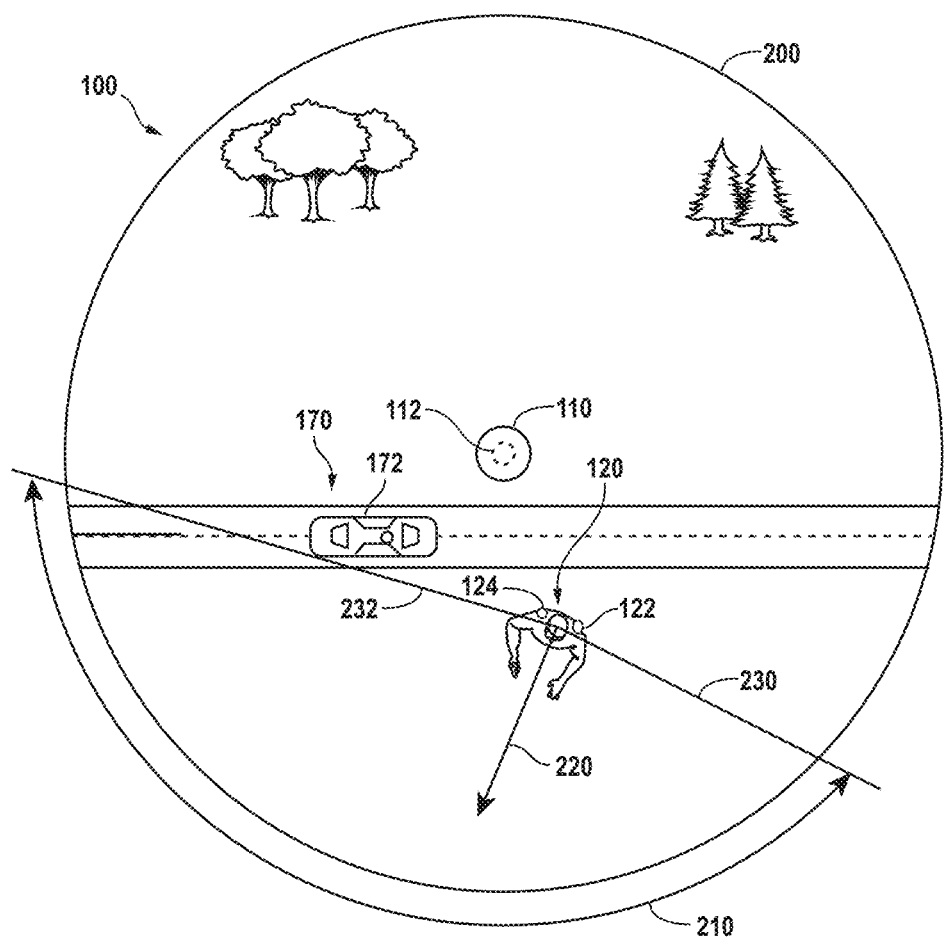
FIG. 2 is a diagram of a person's horizontal field of view relative to an area.
Figure 3:
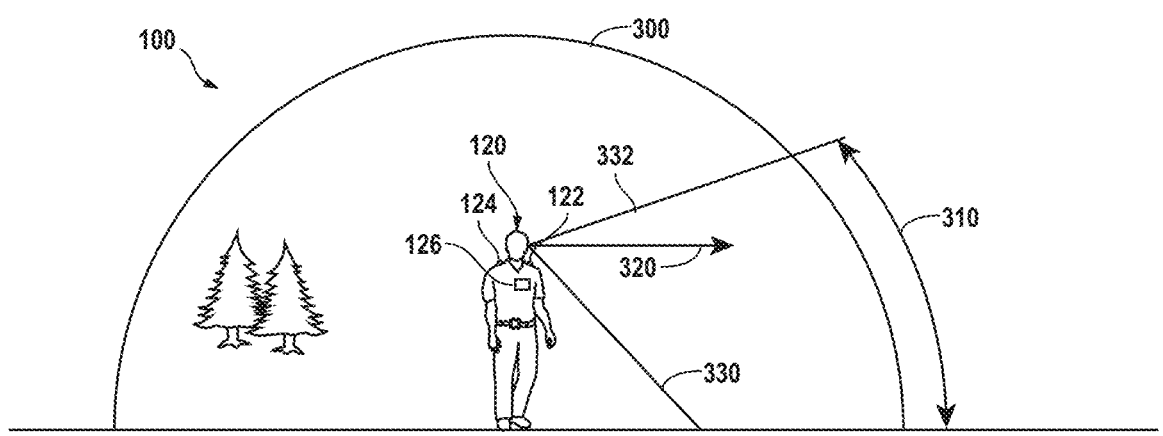
FIG. 3 is a diagram of person's vertical field of view relative to the area.

As discussed above, multiple capture systems allow more aspects of an incident to be recorded. For example, in scene 100, capture systems 112, 122, 124, 126, and 172 may each possess a field of capture less than or equal to 360 degrees. Their combined captured data may be aligned to form a 360-degree field of capture. The portion of a 360-degree field of capture of scene 100 that is within a person's horizontal and vertical field of view is shown in FIGS. 2 and 3 respectively. The limits of a person's horizontal field of view 210 are shown by lines 230 and 232. Line 220 (e.g., centerline) represents the center of the person's horizontal field of view. The horizontal field of view 210 is only a portion of the 360-degree field of capture 200 of scene 100. The limits of a person's vertical field of view 310 are shown by lines 330 and 332. Line 320 represents the center of the person's vertical field of view. The vertical field of view 310 is only a portion of the field of capture 300 of scene 100. Officer 120 may see the portion of scene 100 that are within the lines 230, 232, 330, and 332, but the multiple cameras capture more information than can be seen by officer 120 at any one time.

The field of view of officer 120 may be determined using sensor's attached to the head of officer 120 and/or the field of view may be determined by analyzing the facial features of officer 120 from captured video data.

A capture system may include multiple cameras that are worn by a user. The cameras may be positioned, relative to each other, to provide a field of capture that is greater than the user's field of view. Two or more of the cameras may be oriented so that at least a portion of the respective fields of capture overlap so that they record the same portion of the scene, but at different angles. Video recorded of the same portion of a scene, but at different angles may provide stereoscopic capture. Images captured by stereoscopically positioned cameras may be used to determine (e.g., calculate, detect) a distance from the cameras to objects in the images. Distance to objects may be used to perform one or more other operations.

For example, the distance from the cameras, which is the same as the distance from the user since the captures system is worn by the user, to a human or animal target may be provided to a conducted electrical weapon ("CEW"). The CEW may use the distance information to launch electrodes at appropriate angles so that the electrodes are separated from each other by at least six inches when they contact the target.

A capture system that includes multiple cameras may also collect data to determine the portion of the field of capture that was within the field of view of the user. The capture system may receive data from sensors attached to the user to determine the user's field of view. The cameras of the capture system may capture portions of the anatomy (e.g., facial features) of the user to be used to determine the orientation of the user's head and thus the user's field of view.

For example, capture system 400 is an implementation of a capture system with multiple cameras that is worn by a user. Capture system 400 includes camera 460, camera 470, computer-readable medium 420, processing system 430, and support 440.

Figure 4:
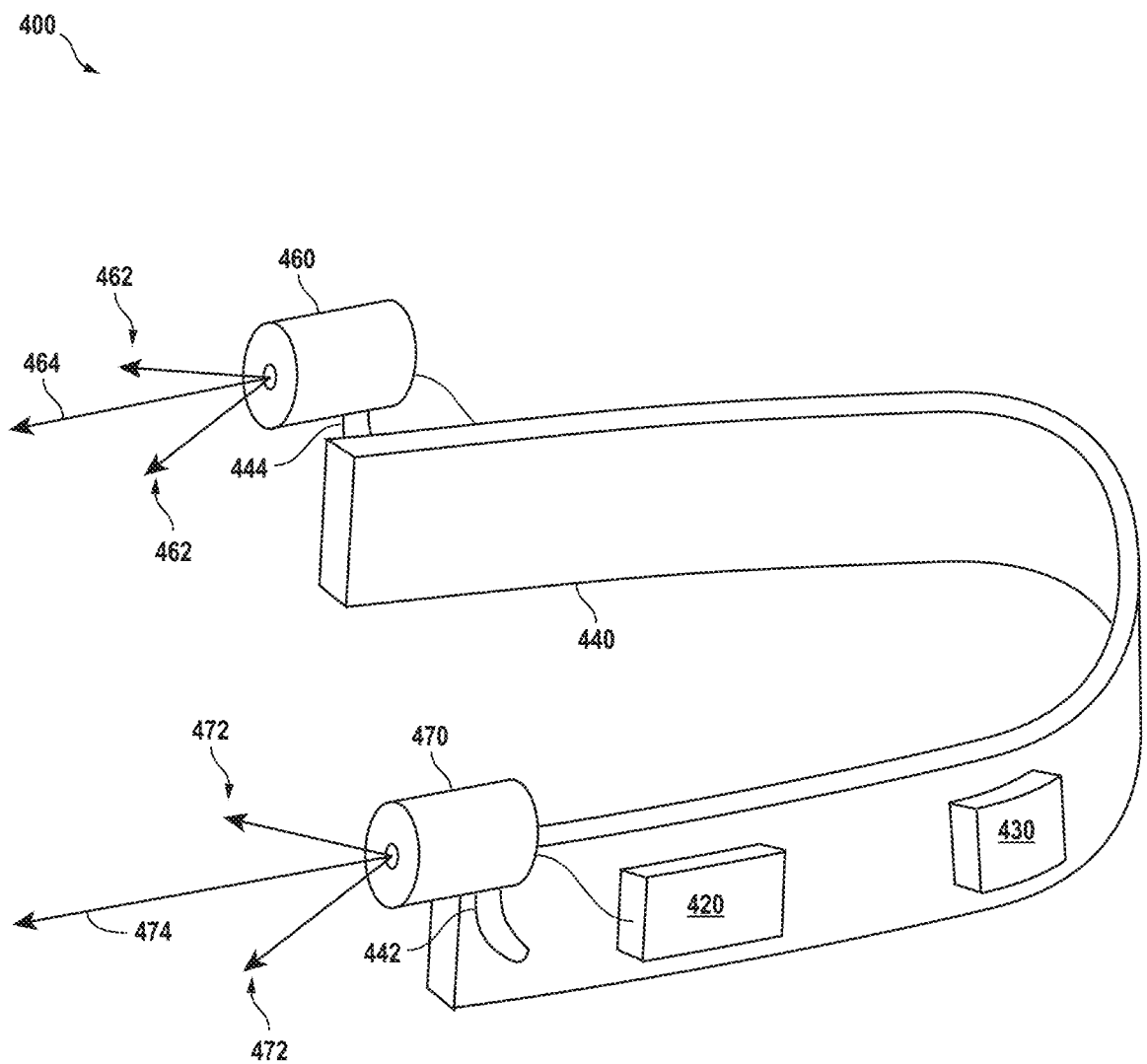
FIG. 4 is an implementation of a multi-camera system according to various aspects of the present disclosure.
Figure 5:
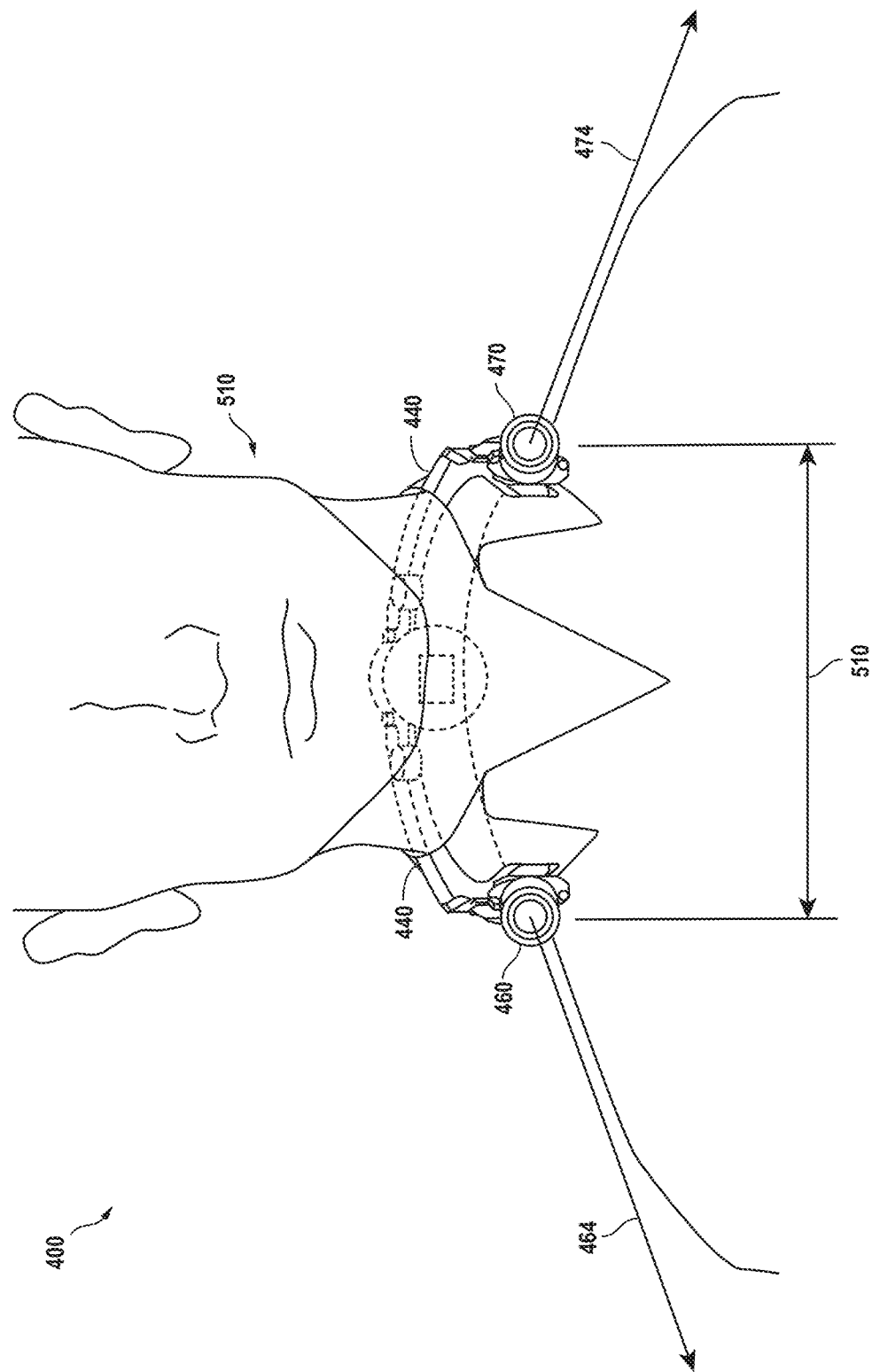
FIG. 5 is the implementation of FIG. 4 positioned around the neck and on the shoulders of a user.
Figure 6:
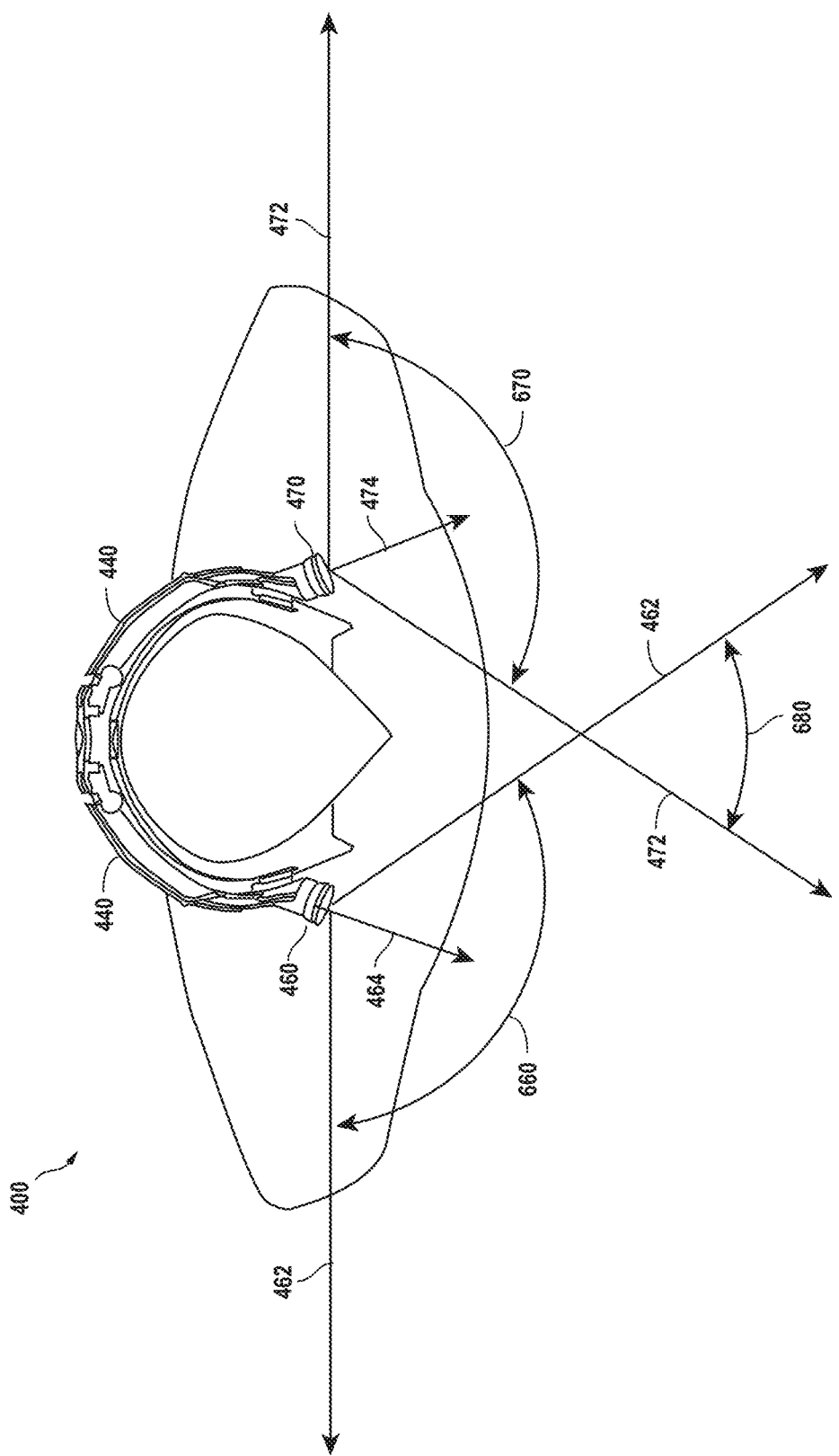
FIG. 6 is another implementation of FIG. 4 positioned around the neck and on the shoulders of a user.

Support 440 is shaped to fit around the neck of a human user and to rest on the shoulders of the user as shown in FIGS. 4-6. While support 440 is positioned around the user's neck, camera 460 and 470 are positioned on each side of the user's head and neck with axis 464 and axis 474 pointing forward with respect to the user. Cameras 460 and 470 are mounted to support 440. In an implementation, cameras 460 and 470 mount to arms 444 and 442 respectively, which in turn couple to support 440.

Support 440 positions camera 460 and camera 470 a distance 510 apart from each other. Distance 510 may be in the range of 4-12 inches depending on the size of the neck of the user and the manner in which support 440 is mounted on the user. Support 440 may be form of a resilient material to squeeze or grip the neck of the user. Support 440 may include other structures for coupling capture system 400 to the clothing (e.g., collar) of the user.

Cameras 460 and 470 are positioned to capture data detected in a field of capture between lines (e.g., rays) 462 and 472 respectively. For example, cameras 460 and 470 capture images of a scene in the area between lines 462 as identified by angle 660 and between lines 472 as identified by angle 670 respectively. Angle 660 and angle 670 may describe, at least in one dimension, an angle of capture of cameras 460 and 470 respectively. The angle of capture of cameras 460 and 470 may be the same or different. Angle 660 and/or angle 670 may be in the range of 110 to 180 degrees.

The area of capture extends from camera 460 and camera 470 as far forward of the user as the cameras are capable of capturing. Axis 464 and axis 474 represent the center of the field of capture of camera 460 and 470 respectively.

If cameras 460 and 470 are positioned with respect to each other, so that the field of capture of camera 460 overlaps the field of capture of camera 470, cameras 460 and 470 may operate as stereoscopic cameras. Cameras 460 and 470 are coupled to support 440 so that the field of capture of camera 460 overlaps the field of capture of camera 470 in the area identified by area of overlap 680. In the area of overlap, camera 460 and camera 470 capture the same portion of a scene. Area of overlap 680 may also be referred to as a binocular field of capture.

In an implementation, the field of capture of camera 460 and 470 overlap sufficiently so that at least one of camera 460 and 470, but preferably both cameras 460 and 470, capture a portion of the facial features (e.g., chin, jaw, cheek) of the user to aid in determining the orientation of the user's head with respect to the fields of capture of cameras 460 and 470.

In area of overlap 680, cameras 460 and 470 provide stereoscopic images of the same area of a scene. Stereoscopic images may be analyzed to determine the distance from cameras 460 and 470 to an object in the binocular field of capture.

Figure 8:
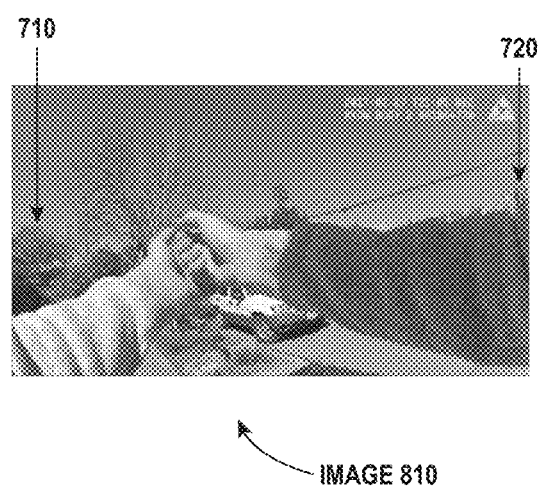
FIG. 8 is a frame of video data captured of the location of FIG. 7 by a chest-mounted camera.

For example, stereoscopic images captured by a prototype of capture system 400 are shown in FIG. 7. The image shown in FIG. 8 is an image take at the same moment in time as the images of capture system 400. In FIG. 7, image 770 was taken by camera 470 and image 760 was taken by camera 460 respectively. Image 810 was taken by a chest mounted camera (e.g., the camera of capture system 126).

Images 760 and 770 as compared to image 810 shows that capture system 400 provides a wider field of capture than the field of capture system 126 that is mounted on the chest of officer 120. Note that trees 710 and 720 in FIG. 7 appear as trees 710 and 720 at the edges of image 810.

Further, capture system 400 is mounted higher on a user's anatomy than capture system 126. Mounting capture system 400 on the neck and/or the shoulders of the user places camera 460 and camera 470 in a position above the arms of the user so that the user's arms, for example when holding a firearm or CEW, do not block cameras 460 and 470. Capture system 126 is mounted on the user's chest, so, as can be seen in FIG. 8, the user's arms block the scene so that capture system 126 does not capture what is transpiring.

Capture system 400 further provides area of overlap 680 where both camera 460 and camera 470 capture the same portion of the scene, but at a different angle. Area of overlap 680 captures two images of the same objects (e.g., cars, trees, bushes, people). The two images may be used to calculate a distance from cameras 460 and 470 to the object. For example, a distance may be calculated from cameras 460 and 470 to vehicle 730.

Cameras 460 and 470 of capture system are also positioned to capture a portion of the user's anatomy to aid in determining the direction in which the user is looking. Camera 460 captures the right-hand side view of the user's chin 740 while camera 470 captures the left-hand side view of the user's chin 740. The image of the chin may be used to determine the direction that the user is looking and thereby determine, as is discussed below, the portion of image 760 and image 770 that can be seen by the user. In FIG. 7, the image of the chin shows that the user is facing slightly to the left of straight ahead.

Capture system 400 may be implemented in various ways. Capture system 400 may include two or more cameras. Capture system 400 may include one or more microphones that are integrated with the cameras and/or separate from the cameras, and/or in addition to the microphones in the cameras, to capture sounds at a scene. The components of capture system may be positioned on and/or carried by a user in a variety of manners.

A support may include any structure, material, and/or shape for positioning and supporting a capture system on a user's body including around a user's neck and/or on a user's shoulders. A support may couple to the clothing of a user to provide support for capture system 400. For example, support 440 is suitable for positioning and supporting cameras 460 and 470 around neck and/or on the shoulders of a user. Support 440 may further couple to a collar of a user's clothing to provide further support for capture system 400 as further discussed below.

Figure 9:
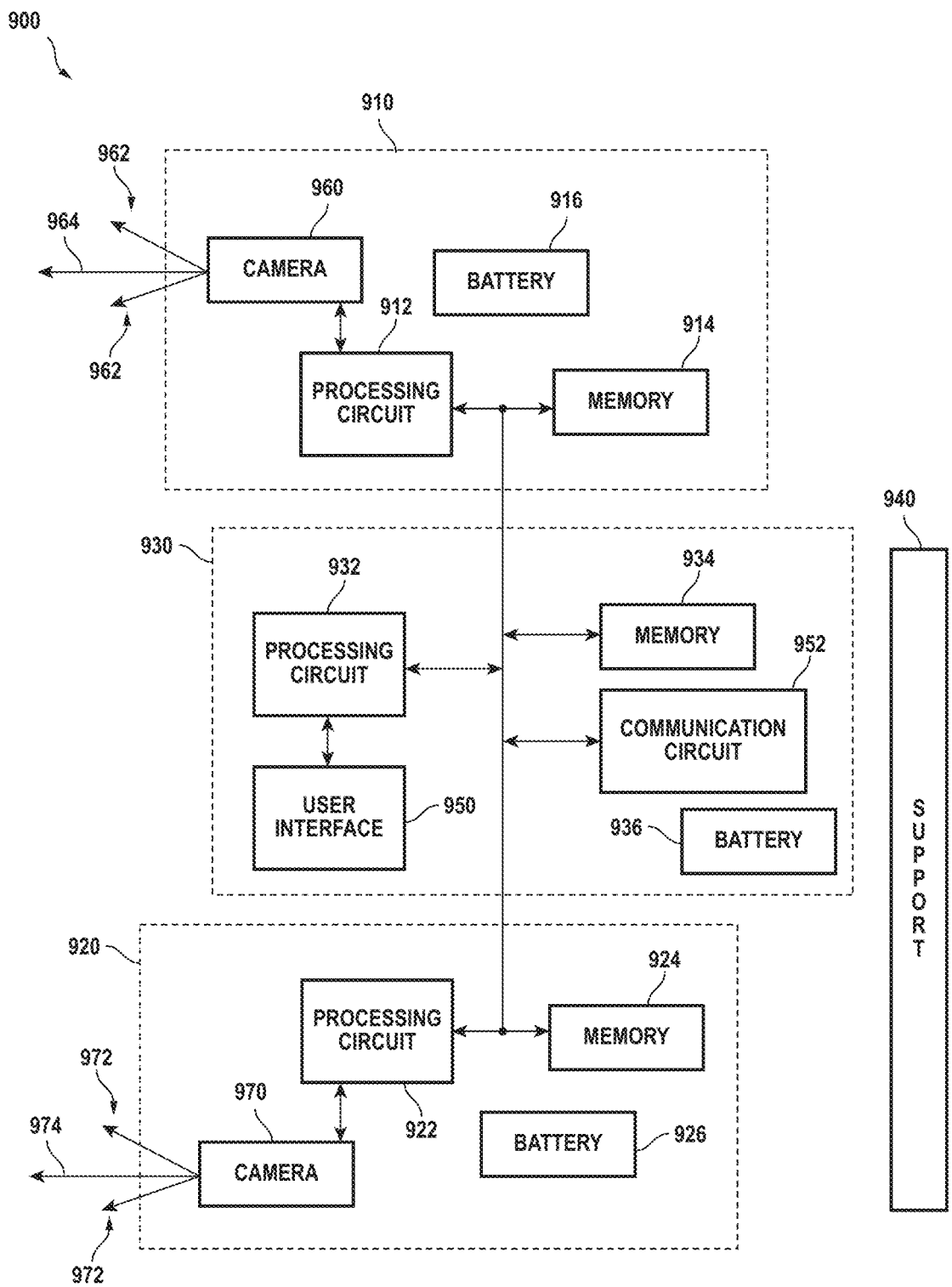
FIG. 9 is a block diagram of an implementation of the system of FIG. 4.
Figure 10:
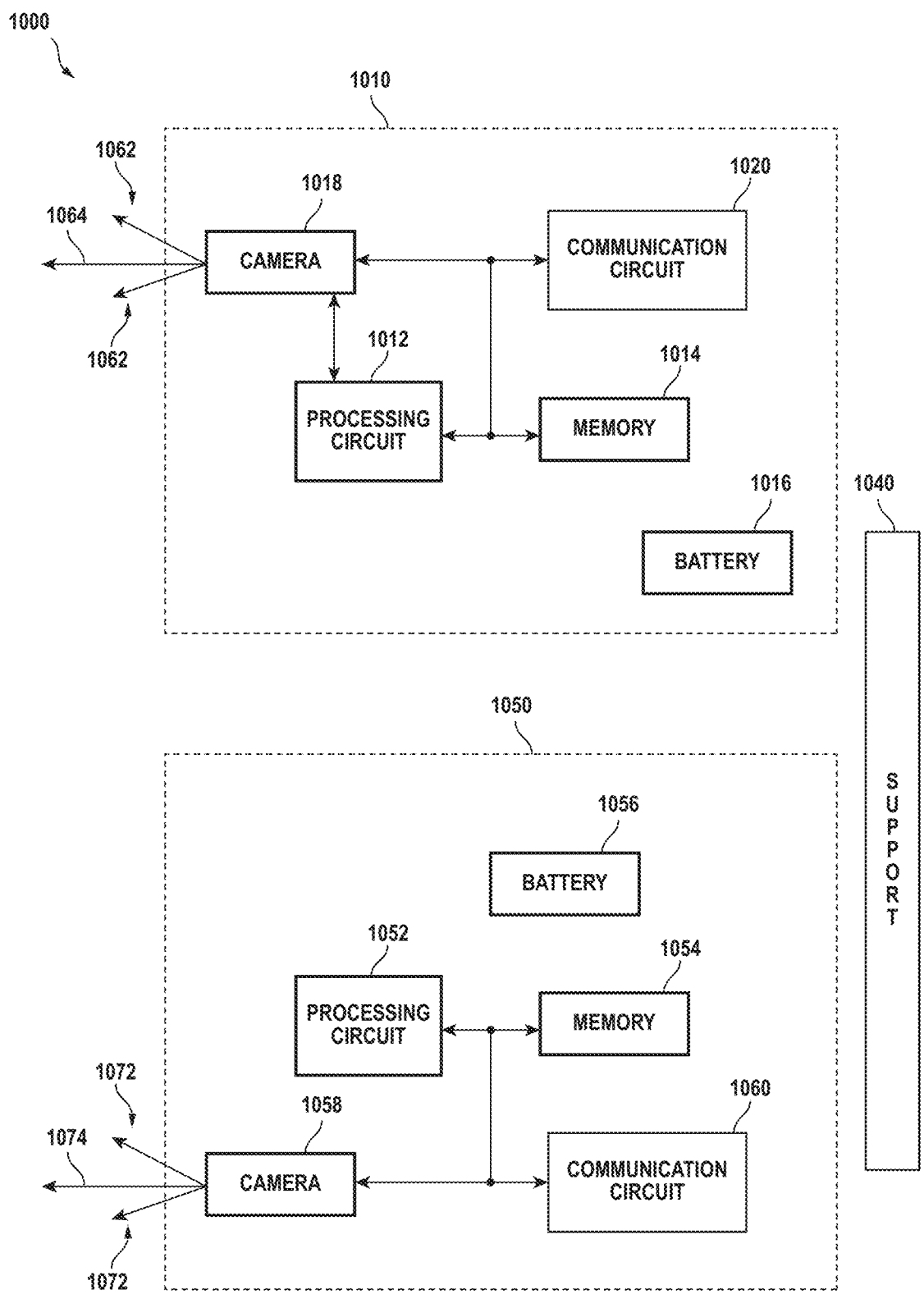
FIG. 10 is a block diagram of another implementation of the system FIG. 4.
Figure 11:
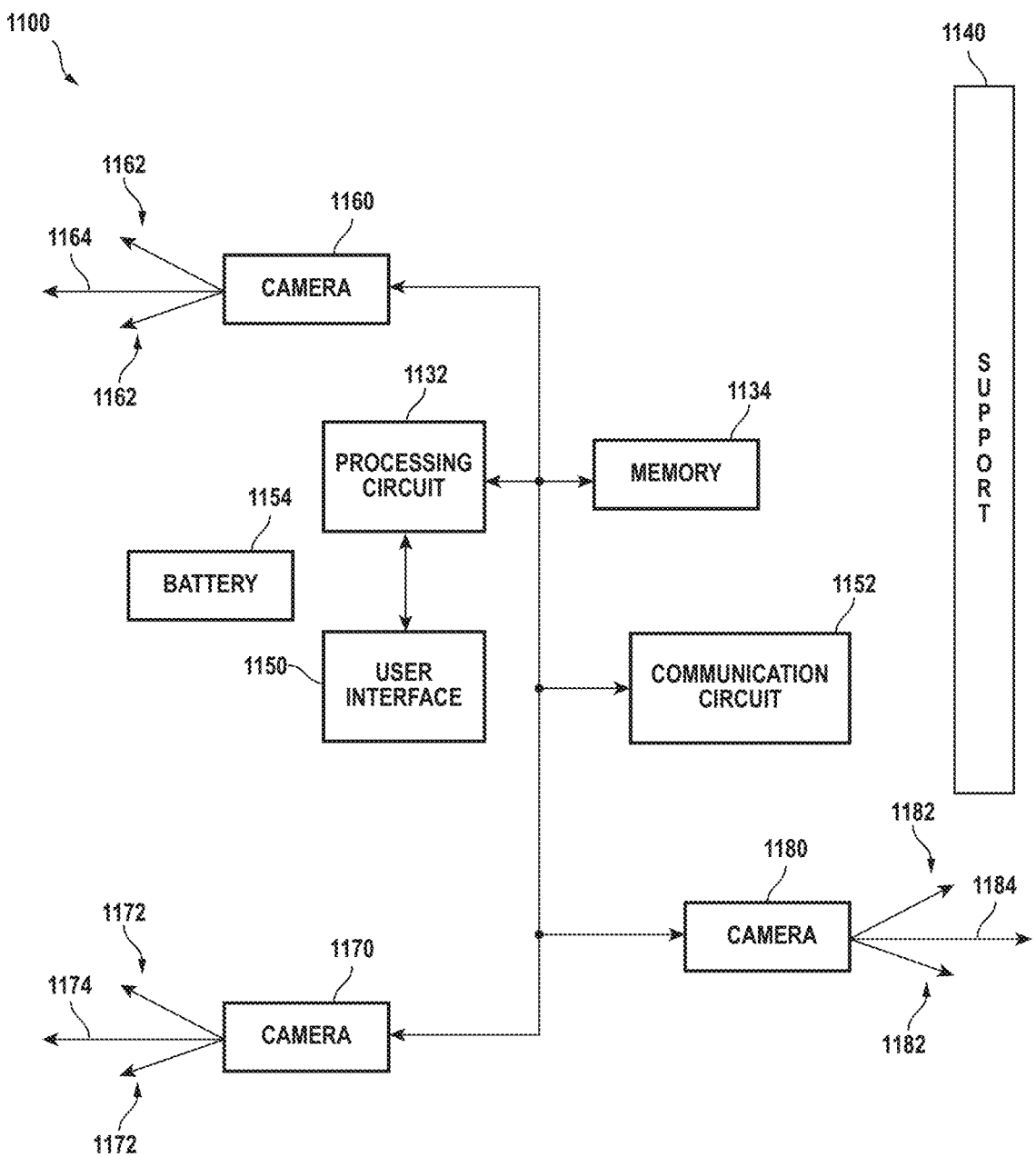
FIG. 11 is a block diagram of another implementation of the system FIG. 4.
Figure 12:
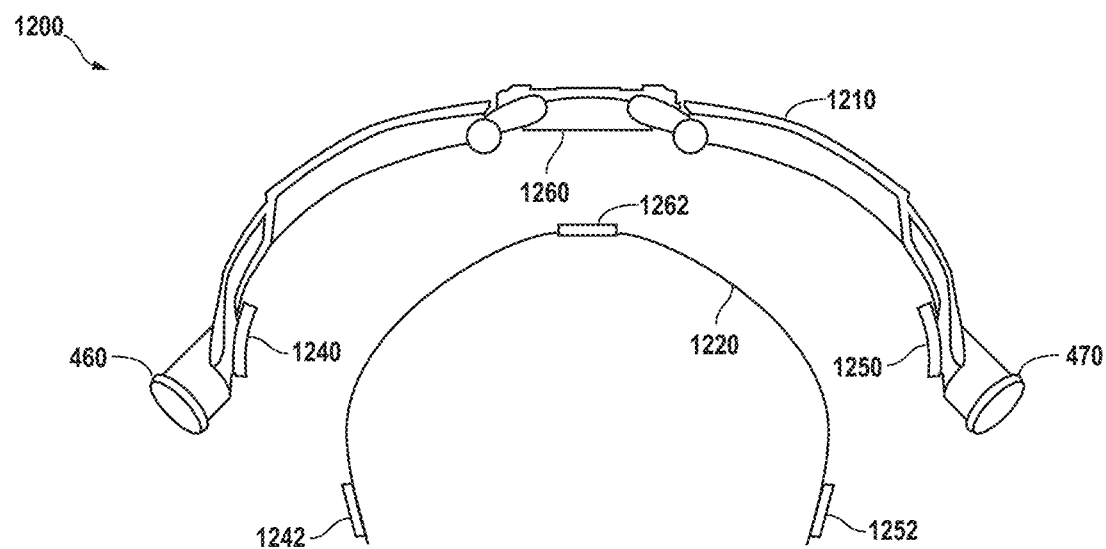
FIG. 12 is an implementation of the system of FIG. 4 for attaching to a collar of a shirt.

Implementations 900, 1000, and 1100 of capture system 400 are shown in FIGS. 9-11. Implementation 900 includes two capture systems 910 and 920. Implementation 900 includes a processing system 930 and a support 940.

Capture system 910 includes processing circuit 912, memory 914, battery 916, and camera 960. Capture system 920 includes processing circuit 922, memory 924, battery 926, and camera 970. Cameras 960 and 970 are positioned to capture data detected in a field of capture 962 and 972 respectively which line between the lines along the edges of the field of capture. Axis 964 and axis 974 represent the center of the field of capture of camera 960 and camera 970 respectively. Processing system 930 includes processing circuit 932, memory 934, battery 936, user interface 950, and communication circuit 952.

In another implementation of capture system 400, implementation 1000 includes two capture systems 1010 and 1050 and a support 1040. Capture system 1010 includes processing circuit 1012, memory 1014, battery 1016, camera 1018, and communication circuit 1020. Capture system 1050 includes processing circuit 1052, memory 1054, battery 1056, camera 1058, and communication circuit 1060.

In another implementation of capture system 400, implementation 1100 includes processing circuit 1132, memory 1134, user interface 1150, communication circuit 1152, battery 1154, camera 1160, camera 1170, and camera 1180. Cameras 1160-1180 are positioned to capture data detected in a field of capture between lines (e.g., rays) 1162, 1172, and 1182 respectively. Axis 1164, axis 1174, and axis 1184 represent the center of the field of capture of camera 1160, camera 1170, and camera 1180 respectively.

A capture system (e.g., camera, microphone, GPS receiver, electronic compass, electronic gyroscope, sensors) detects physical properties in an environment and records (e.g., stores) the information (e.g., data) regarding the physical properties. Information that is captured and recorded is referred to herein as captured data. Captured data may be analyzed to determine characteristics of the physical properties detected and recorded.

Captured data may relate to an incident (e.g., event, occurrence). Captured data may provide a record of an incident. Captured data may be reviewed to provide a reminder of the incident. Captured data may be used as evidence to prove the occurrence of an incident. Captured data may be used as and referred to as evidence.

A capture system may communicate (e.g., transmit, receive) with other electronic devices via a short-range wireless communication link. A capture system may communicate with a network and via the network with other electronic devices. A capture system may communicate with a network using a long-range communication protocol. A capture system may transfer captured and recorded data to another system, such as a server.

A capture system may detect and record visual (e.g., video, related to light) physical properties and/or audible (e.g., audio, related to sound) physical properties. Visual and audible detected properties together may be referred to as audiovisual data or video data and audio data respectively. As used herein, the terms audiovisual information, audiovisual data, or audiovisual recordings refers to video data that includes audio data, video data that is associated with separate audio data, or audio data alone. Use of the term video data may refer to both video and audio data together.

Visual and/or audible physical properties detected and recorded may be within the range of vision and/or hearing of a human. Visual and/or audible physical properties detected and recorded may be outside the range of vision and/or hearing of a human. The capture and storing of video and/or audio data may be accomplished using any suitable technique.

A capture system may create an audiovisual record. Data captured and/or stored by a capture system may be stored in any suitable format, including but not limited to H.264, MPEG-4, AAC, and WAV. A capture system may convert captured data from one format (e.g., analog data, encoding) to another format.

A capture system may communicate (e.g., transmit, receive) captured data. A capture system may transmit captured data to another system (e.g., server, computing device). A capture system may include any communication circuitry for transmitting and/or receiving data. A capture system may use any wired (e.g., LAN, Ethernet) or wireless communication (e.g., Bluetooth, Bluetooth Low Energy, WiFi, ZigBee, 2G, 3G, 4G, WiMax) protocol. A capture system may store audiovisual data for a given period of time then transmit the audiovisual data to another system. A recording system may transmit audiovisual information to another system as it is captured, or shortly thereafter, (e.g., live streaming).

A capture system may capture and provide data in addition to audiovisual information, such as a capture system identifier, the operator of the capture system, an identifier of the incident captured, date of capture, captures system orientation, geographic location of capture system, information from sensors (e.g., position sensors on user, head orientation sensors on user). Additional data may be provided as metadata to the audiovisual data.

A processor circuit includes any circuitry and/or electrical/electronic subsystem or component for performing a function. A processor circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a computer, a radio, a network appliance, data busses, address busses, and/or a combination thereof in any quantity suitable for performing a function and/or executing one or more stored programs.

A processing circuit may further include passive electronic devices (e.g., resistors, capacitors, inductors) and/or active electronic devices (op amps, comparators, analog-to-digital converters, digital-to-analog converters, programmable logic). A processing circuit may include data buses, output ports, input ports, timers, memory, and arithmetic units.

A processing circuit may provide and/or receive electrical signals whether digital and/or analog in form. A processing circuit may provide and/or receive digital information via a bus using any protocol. A processing circuit may receive information, manipulate the received information, and provide the manipulated information. A processing circuit may store information and retrieve stored information. Information received, stored and/or manipulated by the processing circuit may be used to perform a function and/or to perform a stored program.

A processing circuit may have a low power state in which only a portion of its circuits operate or it performs only certain function. A processing circuit may be switched (e.g., awoken) from a low power state to a higher power state in which more or all of its circuits operate or it performs additional functions or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of data/address bus.

As understood by one of ordinary skill in the art, a "computer-readable medium" (e.g. memory, storage) as described herein may be any suitable device configured to store data for access by a processing circuit. A computer-readable medium receives data. A computer-readable medium retains (e.g., stores) data. A computer-readable medium retrieves data. A computer-readable medium provides data for use by a system, such as a processing circuit. A computer-readable medium may organize data for storage. A computer-readable medium may organize data as a database for storage and/or retrieval. The operations of organizing data for storage in or retrieval from a database of a computer-readable medium may be performed by a computer-readable medium. A computer-readable medium may include a repository for persistently storing (e.g., non-volatile storage) and managing collections of data. A computer-readable medium may store files that are not organized in a database.

An example of a computer-readable medium which includes reliable storage but also low overhead, is a file system or database management system that stores data in files (or records) on a computer-readable medium such as flash memory, random access memory (RAM), and/or hard disk drives.

One example of a computer-readable medium suitable for use in server 1810 is a highly reliable, high-speed, relational database management system ("RDBMS") executing on one or more processing circuit (e.g., computing devices) and accessible over a high-speed network. However, any other suitable storage technique and/or device capable of quickly and reliably providing the stored data in response to queries may be used, such as a key-value store and an object database.

Captured data computer-readable medium 1850, alignment computer-readable medium 1860, and field of view computer-readable medium 1870 perform the functions of a computer-readable medium discussed herein. A computer-readable medium may be implemented using any computer-readable medium. An engine (e.g., 1820, 1830, and 1840) may access data stored in computer-readable mediums 1850-1870 locally (e.g., via data bus), over a network, and/or as a cloud-based service.

One of ordinary skill in the art will recognize that separate computer-readable mediums described herein may be combined into a single computer-readable medium, and/or a single computer-readable medium described herein may be separated into multiple computer-readable mediums, without departing from the scope of the present disclosure.

Computer-readable medium may also be referred to as a data store.

A communication circuit transmits and/or receives information (e.g., data). A communication circuit may transmit and/or receive (e.g., communicate) information via a wireless and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA, LTE, BLE, EDGE, EV-DO) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., camera system) may communicate with a communication circuit in another device (e.g., smart phone). Communications between two devices may permit the two devices to cooperate in performing a function of either device. For example, as discussed above, the user interface for a camera system may be implemented on a smart phone that includes a touch screen. User interaction with the user interface on the smart phone is communicated to the camera system via the communication circuits of the smart phone and camera system. The camera system performs the function communicated by the message from the smart phone. Any information produced by the camera system for the user may be communicated from the camera system to the smart phone via the communication circuits for presentation on the display of the smart phone.

A network enables electronic communication. A network enables electronic communication between systems, servers, and/or computing devices (e.g., processing circuits, processors). A network may include nodes. Data may be transferred between nodes. A communication link (e.g., data link) permits the transfer of information between nodes of the network. A communication link may include a wired or wireless connection. A node of a network may include any electronic system (e.g., server, processor, smart phone, router, switch). A system may provide and/or receive data via other nodes and communication links of the network.

As an example of communication via a network, capture systems 1812, 1822, and 1682 may use communication link 1886, communication link 1888, and communication link 1884 respectively to communicate through network 1890 with server 1810.

A user interface provides an interface between a user and an electronic device. A user interface enables communication between a user and an electronic device. A user interface enables a human user to interact with an electronic device. A user may control, at least in part, an electronic device via a user interface. A user may provide information and/or commands to an electronic device via a user interface. A user may receive information and/or responses from the electronic device via the user interface.

A user interface may include one or more controls that permit a user to interact and/or communicate with a device. A user may manually operate the one or more controls to control (e.g., influence) the operation (e.g., functions) of the device. A control includes any electromechanical device for operation by a user to establish or break an electrical circuit. A control may include a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, and a key lock switch (e.g., switch lock). Operation of a control may occur by the selection of a portion of a touch screen.

A user interface may provide information to a user. A user may receive visual, haptic (e.g., tactile, kinesthetic), and/or audible information from a user interface. A user may receive visual information via devices (e.g., indictors) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed. A user interface may include a communication circuit for transmitting information to an electronic device for presentation to a user. For example, a user interface may wirelessly transmit information to a smart phone for presentation to a user as discussed above.

A user interface may include voice to text converter or a voice to processing circuit instruction converter so that a user may interact with the user interface verbally (e.g., by voice).

A power supply provides power (e.g., energy). A power supply may provide electrical power. Providing electrical power may include providing a current at a voltage. Electrical power from a power supply may be provided as a direct current ("DC") and/or an alternating current ("AC"). A power supply may include a battery. A power supply may provide energy for performing the functions of a device. A power supply may provide energy for operating the electronic and/or electrical components (e.g., subsystems) of a device.

The energy of a power supply may be renewable or exhaustible. The energy from a power supply may be converted to another form (e.g., voltage, current, magnetic) to perform the functions of a device.

A support may physically couple to the components of a capture system. A support may support (e.g., hold) the weight of the components of a capture system. A support may physically couple to a camera. A support may support a camera so that the camera and/or microphone (e.g., directional microphone) is positioned along an axis for capturing information. A support may position two or more cameras and/or microphones along a respective axis so that each camera and/or microphone captures data (e.g., information) along its respective axis. The extent (e.g., amount up and down, amount right to left, vertical number of pixels, horizontal number of pixels, field of view) of the images captured by a camera long its axis of orientation may be referred to as its field of capture. For example, the number of pixels in the horizontal direction and the number of pixels in the vertical direction from the center (e.g., axis) of the frame.

A support may physically couple to one or more sensors.

A support may physically couple to a user interface. A support may position the controls of the user interfaced for convenient operation by a user. A support may position indicators and/or sound generators (e.g., speakers) within the sight or hearing of a user. A support that includes a rigid structure may transmit haptic information (e.g., motion, vibration) from the user interface to the body of the user.

A support may physically contact and/or physically couple to a user. A support may physically contact and/or physically couple to clothing of a user. A support may orient the components of a system with respect to the body of a user. A support may orient a camera and/or a microphone with respect to a user. A support may orient an axis of capture of one or more cameras and/or microphones with respect to a user.

Implementation 900 includes camera 960 and camera 970 which capture video and audio data along axis 964 and axis 974 respectively. Cameras 960 and 970 may capture within field of capture 962 and field of capture 972 respectively. Data captured by cameras 960 and 970 is stored in memory 914 and 924 respectively. Processing circuit 912 and processing circuit 922 control, at least in part, camera 960 and camera 970 respectively and/or cooperate with camera 960 and camera 970 respectively to capture and store video and audio information.

Memory 914, memory 924, and memory 934 may respectively store respective programs executed by processing circuit 912, processing circuit 922, and processing circuit 932 respectively.

Axis 964 is different from axis 974. In an implementation, axis 964 is separate from axis 974. Axis 964 may be parallel to axis 974. Axis 964 may diverge from axis 974 so that the axes do not intersect. The divergence may be slight so that the overlap between the fields of view of the cameras great. The divergence may be great so that the overlap between the fields of view of the cameras is slight. Axis 964 may converge with axis 974 so that at some point a distance away from the cameras the axes intersect.

In an implementation, axis 964 diverges from axis 974 so that the field of capture of camera 960 overlaps at least a part of the field of capture of camera 970 so that camera 960 captures and records some of the same data as camera 970 except from a different point of view.

Camera 960, processing circuit 912 and memory 914 may be combined (e.g., packaged together) and/or integrated. Camera 970, processing circuit 922 and memory 924 may be combined (e.g., packaged together) and/or integrated. Processing circuit 912 and processing circuit 922 may encode data captured by camera 960 and camera 970 respectively prior to storing the captured data in memory 914 and memory 924 respectively. Processing circuit 932 may cooperate to encode captured data or exclusively encode captured data. Encoding may include compressing the data in a lossy or lossless manner.

Processing circuit 932 may cooperate with user interface 950 to receive information, including instructions, from and provide information to a user. A user may instruct processing circuit 932 to perform a function via user interface 950. Processing circuit 932 may inform a user of completion of a function and/or start of an operation (e.g., recording, data transfer) via user interface 950.

Processing circuit 932 may cooperate with memory 914 and memory 924 to retrieve data captured and stored by capture systems 910 and 920. Processing circuit 932 may transfer data from memory 914 and/or memory 924 to memory 934. Processing circuit 932 may cooperate with processing circuit 912 and/or processing circuit 922 to transfer data from memory 914 and/or memory 924 to memory 934.

Processing circuit 932 may cooperate and/or control, at least in part, communication circuit 952 to transmit and/or receive data. Processing circuit 932 may instruct communication circuit 952 to transfer (e.g., transmit, send) data from memory 934 to a server via a network (not shown). Processing circuit 932 may instruct communication circuit 952 to transfer data from memory 914 and/or memory 924 to a server. Communication circuit 952 may receive data. Communication circuit 952 may receive data from a server via a network. Communication circuit 952 may receive data for use by processing circuit 912, 922, and/or 932. Communication circuit 952 may receive new and/or updated program for execution by processing circuit 912, 922, and/or 932. Processing circuit 932 may store or cooperate with communication circuit 952 to store received data in memory 914, 924, and/or 934.

Battery 916, battery 926, and battery 936 provide power for the operation of the electronic components of capture system 910, capture system 920, and processing system 930 respectively. The functions performed and the power provided by battery 916, battery 926, and battery 936 may be performed and provided by a single power supply (e.g., battery). Batteries 916, 926, and/or 936 may be rechargeable and/or replaceable. Processing circuit 912, 922, and/or 932 may monitor an amount of power available for delivery by battery 916, 926, and/or 936. Processing circuit 932 may provide a message via communication circuit 952 when a battery is at or near dead.

Support 940 may physically couple to and support the housing (e.g., packaging) of capture system 910, capture system 920, processing system 930, and/or any component of the systems. Support 940 may physically couple to camera 960 and camera 970 to position camera 960 and camera 970. The coupling between support 940, camera 960, and camera 970 may be detachable so that camera 960 and/or camera 970 may be removed or reattached to support 940.

Support 940 may be configured to couple to and/or rest on the body of a user. While coupled to and/or resting on the body of a user, support 940 positions camera 960 and camera 970 along axis 964 and axis 974 respectively to capture information.

Capture system 910 and capture system 920 perform the functions of a capture system discussed above. Processing system 930 performs the functions of a processing system discussed above. Support 940 performs the functions and includes the structures of a support discussed above. Camera 960 and 970 perform the functions of a camera and a video camera discussed above. Camera 960 and 970 may perform the functions of a microphone discussed above. Processing circuit 912, 922, and 932 perform the functions of a processing circuit discussed above. Memory 914, 924, and 934 perform the functions of a memory discussed above. User interface 950 performs the functions of a user interface discussed above. Communication circuit 952 performs the functions of a communication circuit discussed above. Batteries 916, 926, and 936 perform the functions of a power supply discussed above.

Implementation 1000 includes capture system 1010, capture system 1050, and support 1040. Capture system 1010 works independently of capture system 1050. Each capture system captures data along the axis and within the field of capture of the camera of the capture system. Captures system 1010 and 1050 are mounted on support 1040 for positioning cameras 1018 and 1058 with respect to a user.

Processing circuit 1012 and processing circuit 1052 may perform the functions of communication circuit 1020 and 1060 respectively in whole or in part. Communication circuit 1020 and communication circuit 1060 of capture system 1010 and capture system 1050 respectively may transfer captured data to a server. Transfer may be accomplished via a wireless communication link. A communication link may include a network. Transfer may be accomplished by wired communication link. A wired communication link may include a wired connection to a dock. A wire connection may include a connection that uses the USB protocol. A dock may be connected to a network for transfer of data to a server.

Capture system 1010 and capture system 1050 perform the functions of a capture system discussed above. Support 1040 performs the functions and includes the structures of a support discussed. Camera 1018 and 1058 perform the functions of a camera and video camera discussed above.

Camera 1018 and 1058 may perform the functions of a microphone discussed above. Processing circuit 1012 and 1052 perform the functions of a processing circuit discussed above. Memory 1014 and 1044 perform the functions of a memory as discussed above. Communication circuit 1020 and 1060 perform the functions of a communication circuit discuss above.

No user interface is shown in implementation 1000; however, each capture system may include an on-off switch that connects or disconnects battery 1016 and battery 1056 to and from the components of capture system 1010 and capture system 1050 respectively.

Implementation 1100 includes cameras 1160, 1170, and 1180 that capture data along axis 1164, axis 1174, and axis 1184 respectively within field of capture 1162, field of capture 1172, and field of capture 1182 respectively. As discussed above, axis 1164 maybe parallel to, diverge from or converge with axis 1174. In an implementation where axis 1164 diverges from axis 1174, field of capture 1162 may overlap at least in part, field of capture 1172. Axis 1184 may be oriented to parallel to axis 1164 or axis 1174, but with no overlap between field of capture 1182 and fields of capture 1162 and 1172. For example, cameras 1160 and 1170 may be oriented in a forward direction, with respect to the user, while camera 1180 may be oriented in a rearward direction.

Processing circuit 1132 may cooperate with cameras 1160, 1170, and 1180 to transfer captured data from cameras 1160, 1170, and 1180 to memory 1134. Processing circuit 1132 may encode captured data from cameras 1160, 1170, and/or 1180.

Processing circuit 1132 may cooperate with user interface 1150 to communicate with a user as discussed above. Processing circuit 1132 may cooperate with and/or control the operation of communication circuit 1152 to transmit captured data and/or receive data.

Battery 1154 may provide power for all of the electronic components of implementation 1100.

Support 11 may support, position, and/or physically couple to cameras 1160, 1170, and 1180. Support 1140 may support and/or physically couple to battery 1154, processing circuit 1132, user interface 1150, memory 1134, and communication circuit 1152. Support 1140 may couple to and/or be supported by a body of a user.

Support 1140 performs the functions and includes the structures of a support discussed above. Cameras 1160, 1170, and 1180 perform the functions of a camera and video camera discussed above. Cameras 1160, 1170, and 1180 may perform the functions of a microphone discussed above. Processing circuit 1132 performs the functions of a processing circuit discussed above. Memory 1134 performs the functions of a memory (e.g., computer-readable medium) discussed above. User interface 1150 performs the functions of a user interface discussed above. Communication circuit 1152 performs the functions of a communication circuit discussed above. Battery 1154 performs the functions of a power supply discussed above.

In an implementation of support 440, support 1200 includes outer frame 1210 and inner frame 1220. Outer frame 1210 may be positioned on the outside of the collar of a user's shirt. Cameras 460 and 470 may couple to outer frame 1210. The other components of capture system 400 or implementations 900, 1000, and/or 1100 may be positioned inside or mounted on outer frame 1210. Outer frame 1210 may include hinges toward the back of outer frame that permits a user to open outer frame for positioning outer frame around the user's neck. The hinges may provide a resilient force to hold outer frame 1210 around the user's neck. Inner frame 1220 may be positioned on the inside of the collar of a user's shirt. Once inner frame 1220 is positioned inside the user's collar, outer frame 1210 may be coupled to inner frame 1220 so that both inner frame 1220 and outer frame 1210 couple to the user's collar for additional support and positioning of support 1200. In an implementation, magnets 1240, 1250, and 1260 on outer frame 1210 couple to magnets 1242, 1252, and 1262 on inner frame 1220 to couple outer frame 1210 to inner frame 1220 and to clamp the user's collar between outer frame 1210 and inner frame 1220.

Figure 13:
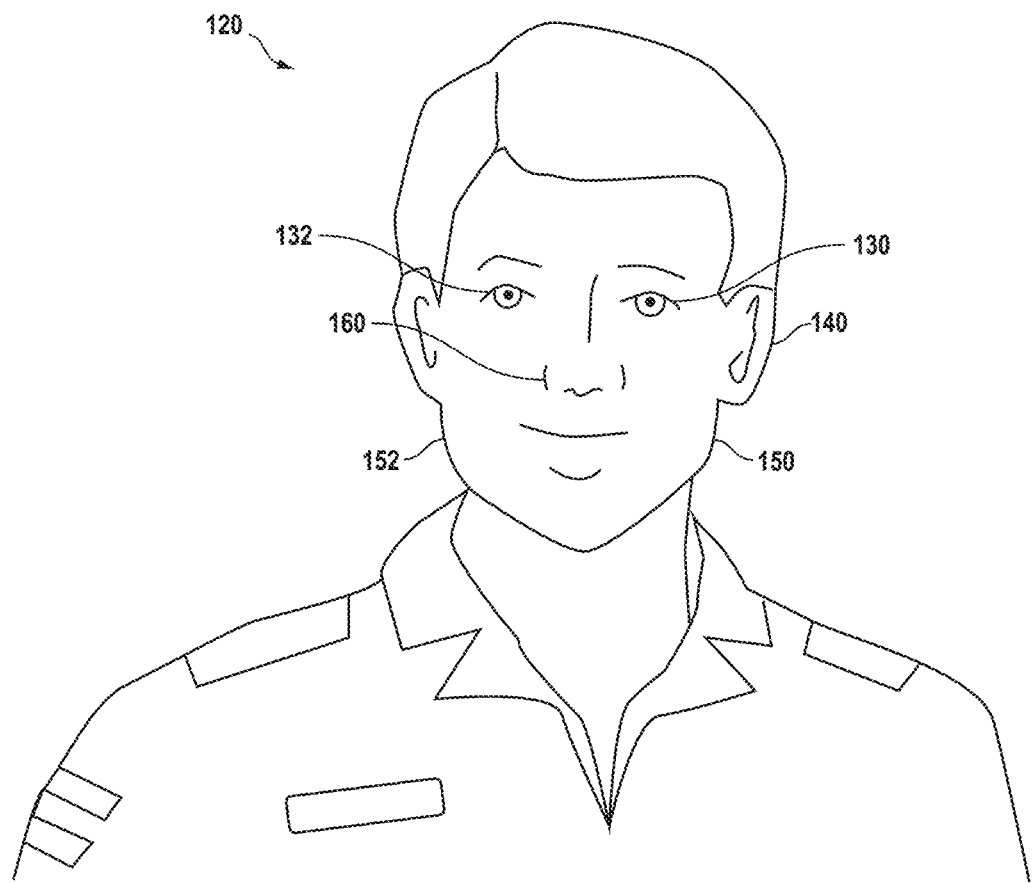
FIG. 13 is a diagram of facial features of a person.
Figure 14:
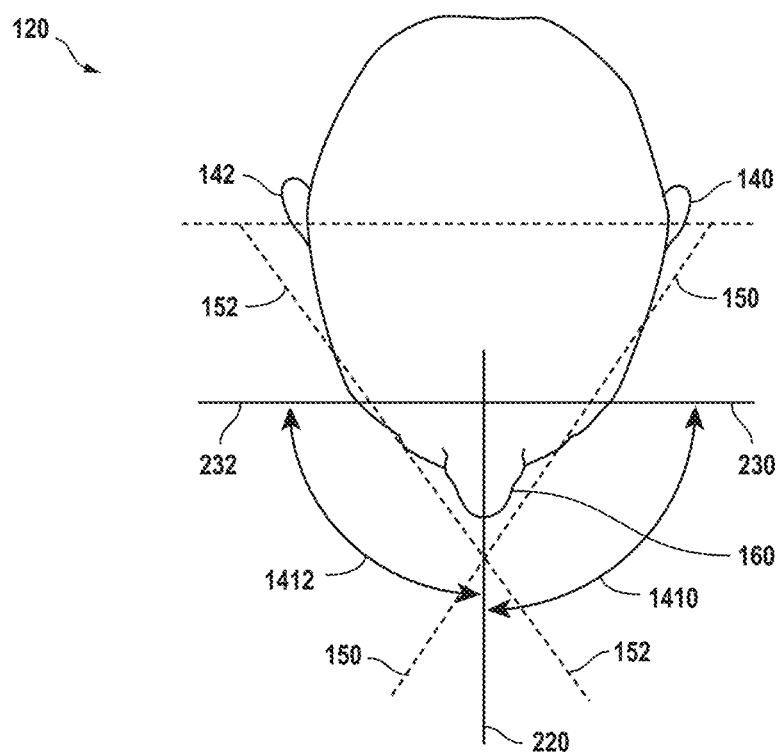
FIG. 14 is a diagram of relationships between facial features and a person's horizontal field of view.

As discussed above, facial features may be used to detect the orientation of a user's head. Information regarding the orientation of a user's head may be used to determine a user's field of view. Facial features of officer 120 may include eyes 130, 132, ears 140, 142, nose 160, jawline 150, and jawline 152 as shown in FIG. 13. As shown in FIG. 14, facial features that provide information as to a person's field of view include Centerline 220 that proceeds outwards from nose 160. Lines 230 and 232, which mark (e.g., indicate, show) the boundary of peripheral vision, proceed outwards from left eye 130, from the perspective of officer 120, and right eye 132 respectively. Angle 1412, between line 232 and line 220, represents the extent of the officer's horizontal field of view on the right side of the officer. Angle 1410 represents the extent of the officer's horizontal field of view on the left side of the officer. Together, the sum of angle 1410 and angle 1412 represents the horizontal field of view.

Facial features may also be used to determine a person's vertical field of view. Centerline 320 may be drawn proceeding outward from the eye. Orientation of ear 142 or ear 140 provides information as to the location and orientation of line 320. The upper extent of the vertical field of view is identified (e.g., delineated) by line 332 and the lower extent by line 330. Angle 1510 is formed between line 332 and the line 320 (e.g., centerline). Angle 1512 is formed between the line 320 and line 330. Angle 1510 and/or angle 1512 may be restricted by head gear such as a hat, a helmet, or a face shield.

Many studies have investigated the field of view of humans under a variety of circumstances. In studies, the field of view of a human is reported as lying in a range of between 100 degrees and 190 degrees. Other studies have defined the term "central field of view", which means the field of view where a person is most likely to see an object or occurrence. The central field of view has been described as being between 60 degrees and 80 degrees from the central axis of vision (e.g., 220, 320). Studies have also reported that the field of view of humans narrows under stress (e.g., a stressful situation), to be around 80 degrees. Other studies of police officers concluded that the practical limits of an officer's field of view is about 45 degrees. Some report a horizontal field of view (e.g., 1410+1412) of a human as being as high as 210 degrees and a vertical field of view (e.g., 1510+1512) as high as 150 degrees.

This disclosure makes no assumptions regarding the field of view, horizontal field of view, vertical field of view, or any combination or measurement thereof. Regardless of the range or number used for the field of view, in any direction, the invention may be used to indicate what was seen or likely seen by a person from the field of capture. A range may be determined for a particular person and/or situation, and the portion of the field of capture that may have been visible to the user, or in other words within the field of view of the user may be identified (e.g., indicated, shown). The identified the field of view, regardless of how identified or determined, may be shown during or with respect to captured visual data.

Figure 16:
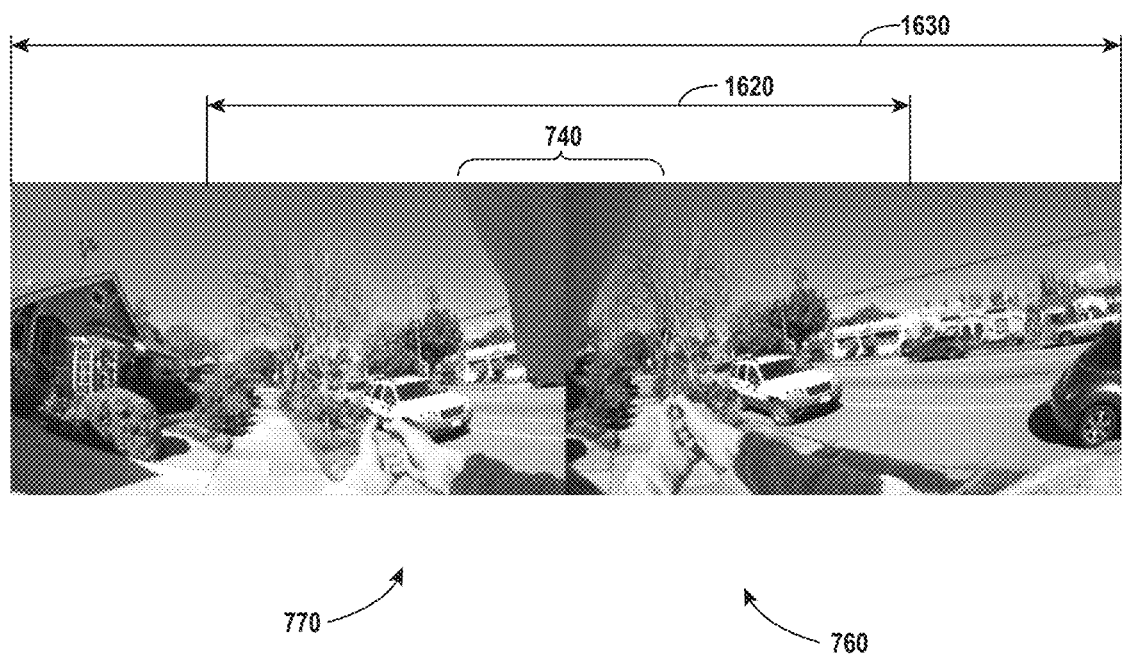
FIG. 16 is a frame of video data captured of a location by the cameras of the system of FIG. 4 identifying the user's field of view.
Figure 17:
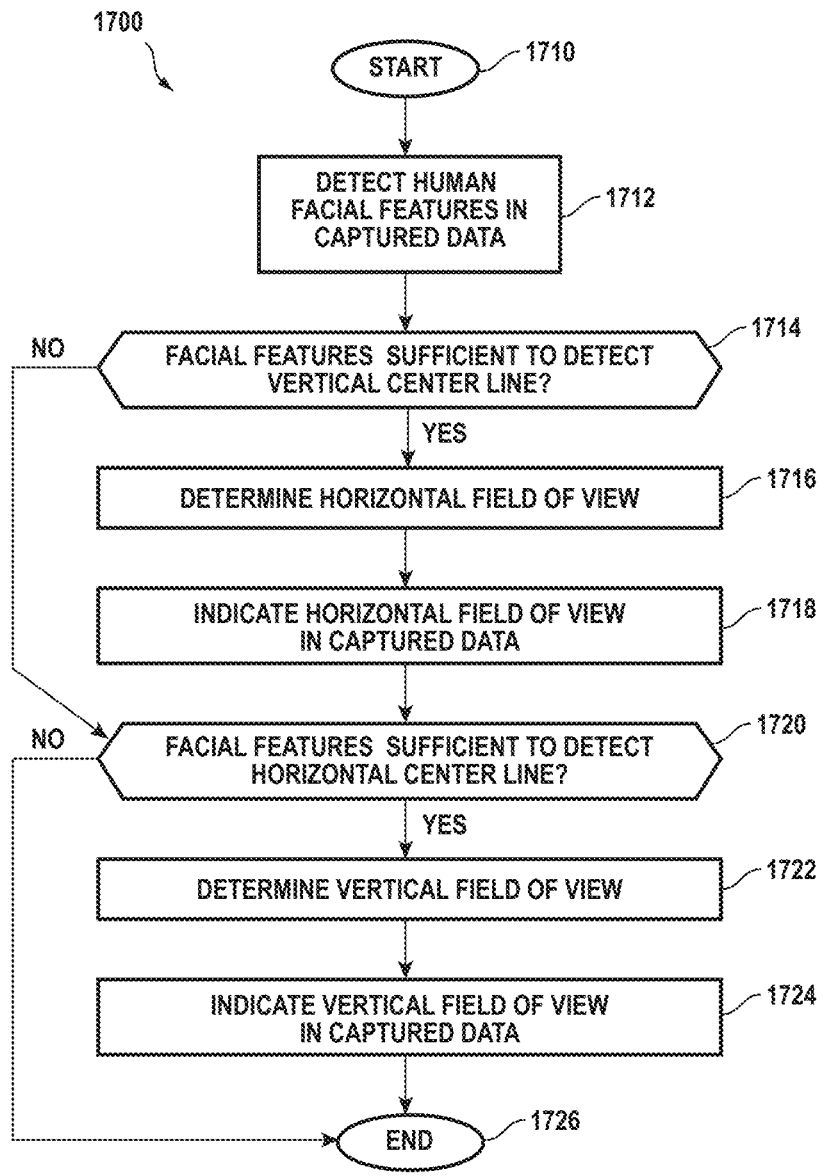
FIG. 17 is a method for using facial features to identify a field of view in captured data.
Figure 18:
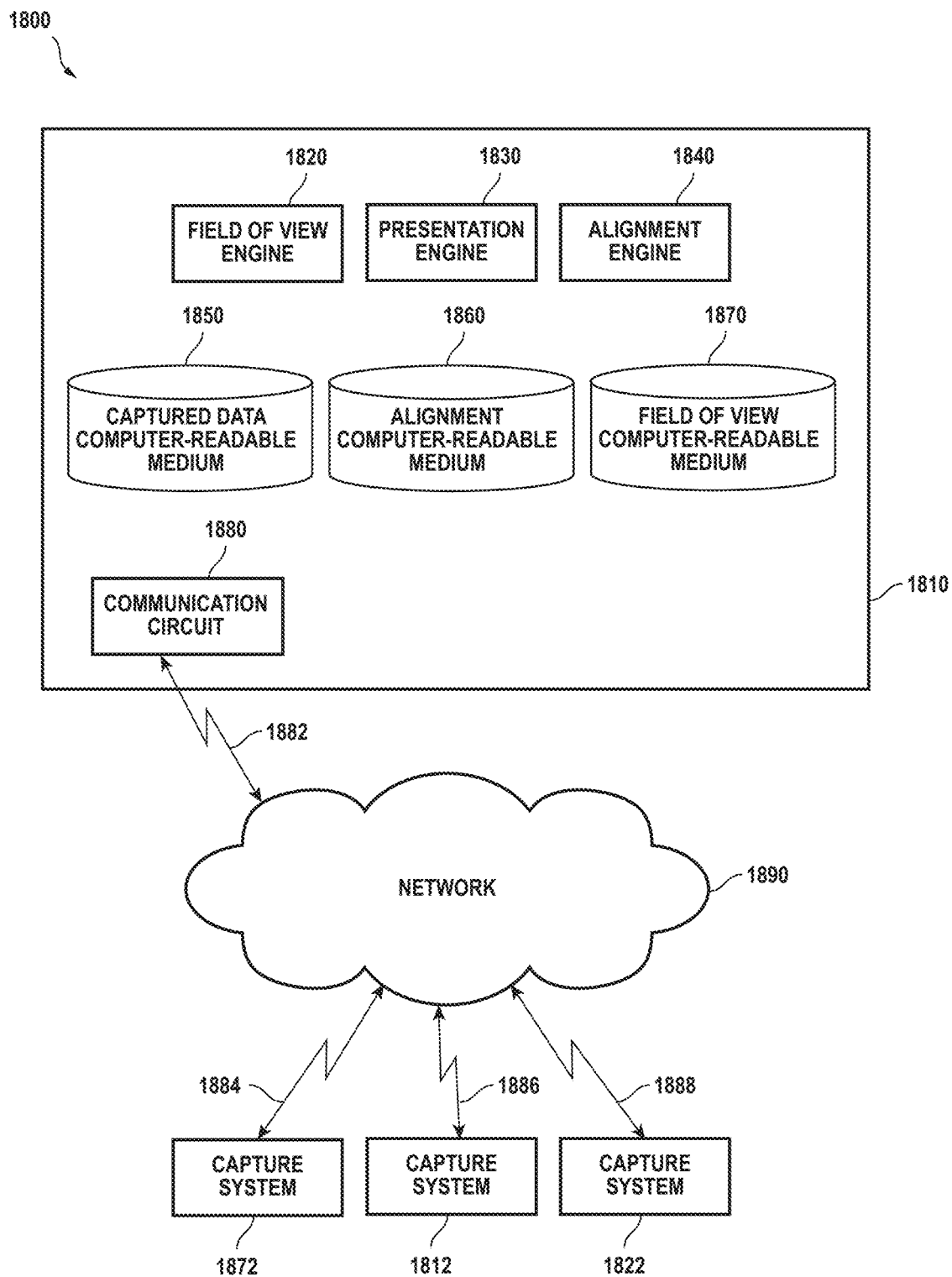
FIG. 18 is a diagram of a system for aligning captured data from different cameras and/or determining a person's field of view with respect to captured data.
Figure 19:
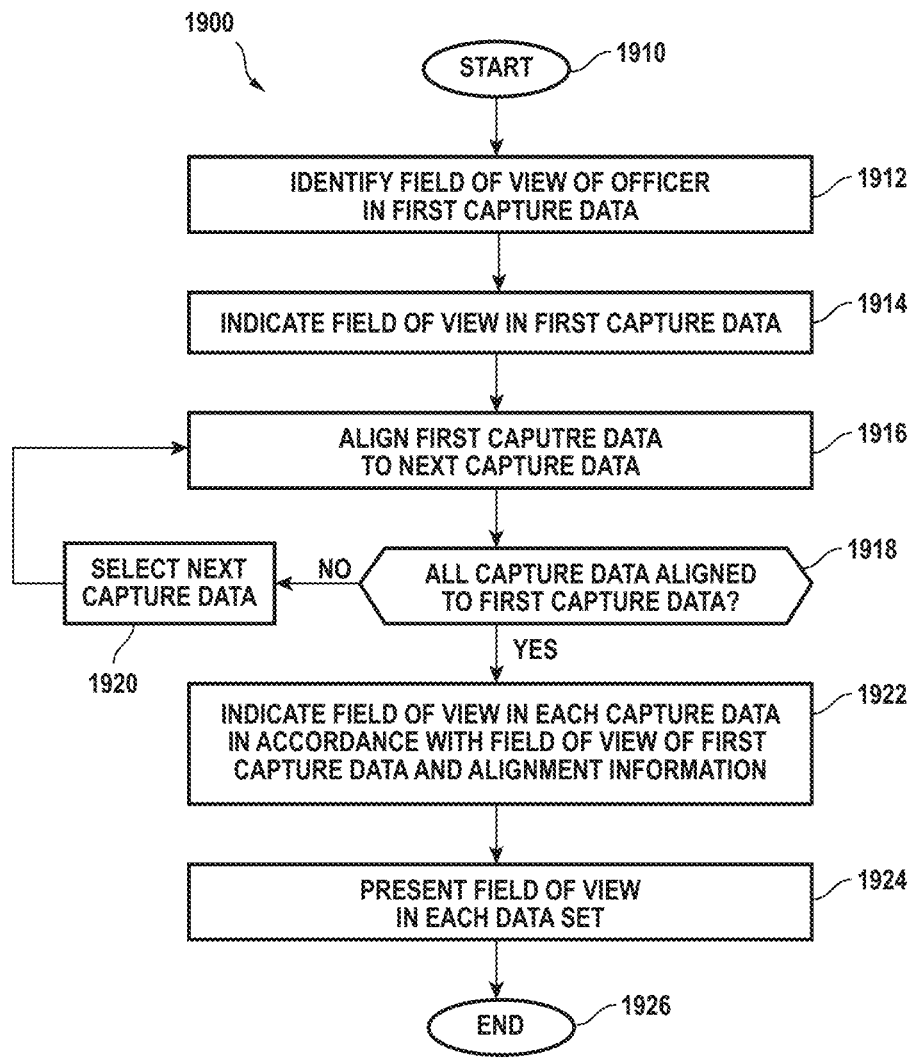
FIG. 19 is a method for aligning captured data from cameras and overlaying a person's field of view on the composite image.

The scene shown in FIG. 16 is the same as the scene shown in FIG. 7. The field of capture of cameras 460 and 470 is the entirety of images 760 and 770. The horizontal field of capture 1630 is identified in FIG. 16. The user's chin 740 may be used to identify the orientation of the user's head, and thereby field of view 1620 of the user within field of capture 1630. The portion of the chin recorded in the video data may be calibrated by having the user fully turn their head to the left, then to the right, then straight ahead to provide a maximum range of movement, a center location, and a recording the visible portion of the chin for the positions in between. Head movements to known positions may be used to calibrate other sensors that may be used to detect and/or record facial features and/or head orientation.

Using the image of user's chin 740 captured by camera 460 and camera 470, the horizontal field of view 1620 may be calculated to be a portion of field of capture 1630. Field of view 1620 represents the portion of the scene of FIG. 16 that would have been visible to the user at that moment in time. As the user turns his or her head, the portion shown by field of view 1620 would pan across field of capture 1630. The portions of field of capture 1630 that lie outside of field of view 1620 were not visible to the user at that moment in time.

A capture system may include other sensors for detecting the orientation of a user's head and in particular the user's eyes with respect to the field of capture of a capture system. Sensors may detect any physical property to detect directly or indirectly the position and/or orientation of a user's head. For example, sensors (e.g., capacitive, inductive) may be coupled to a support (e.g., support 440) proximate to cameras 460 and 470. The sensors may be directed toward the head and/or face of the user. The sensors may detect when the head or a portion thereof, such as the chin or cheek, is proximate to one or more of the sensors and further away from the other sensors. The information from the sensors may be used to determine the orientation of the user's head.

Sensors may be coupled to a user's head that cooperate with the sensors on a support to detect orientation of a user's head. For example, a chin strap on a helmet may include a magnet that provides a magnetic field for detection by the sensors on a support or in a capture system. Glasses worn by a user may generate or have a physical property that is detected by the sensors of capture system 400 to determine the orientation of the user's head. Detecting the position and/or proximity of a filling in a tooth of a user may be used to determine head orientation. Directional microphones may be oriented toward a user's head to detect the user's breathing and/or voice to detect head orientation. An inside surface of a support may include strain gauges to detect additional pressure on a portion of the support that results from the user turning his or her head. A user could also wear laser that emits a beam that indicates the orientation of the user's head. The beam may be detected and recorded by camera 460 and 470.

Sensors may provide information for real-time determination of the orientation of a user's head. The information provided by sensors may be recorded by a capture system for determining the orientation of a user's head after the event (e.g., post-processing).

A vertical field of view of a user may be calculated in a similar manner as the horizontal field of view is calculated.

The field of view of the user in the field of capture may be shown by obscuring (e.g., darkening, making out of focus) the portions of the field of capture that the user could not see at that moment in time. The field of view many be determined and shown relative to the field of capture at the time of presenting the visual data captured by a capture system.

As discussed above, facial features may be used in calculating vertical and/or horizontal fields of view. Method 1700 is an implementation of a method for determining the person's field of view based on identifiable facial features. Field of view engine 1820 and presentation engine 1830 may cooperate to perform method 1700 to identify the field of view of a user and to overlay or shown (e.g., indicate) the field of view on captured data, whether from an individual capture system or aligned (e.g., combined) data from many capture systems.

Method 1700 includes blocks identified as start 1710, detect 1712, vertical line 1714, determine 1716, indicate 1718, horizontal line 1720, determine 1722, indicate 1724, and end 1726.

Performance of method 1700 begins at start 1710. Method 1700 may be repeatedly performed for some or for every frame of captured data.

Detect 1712 detects human facial features in captured data. Detect 1712 may also detect data from sensors that provide information as to the orientation of the user's head. The features may be partially obscured, such as in the case of a shoulder-mounted or head mounted capture system, or otherwise difficult to detect in visual data. Detect 1712 may be executed as needed (e.g., upon detecting a change in orientation) or repeatedly to analyze captured data (e.g., one frame, many frames) to detect facial features or to determine whether sensor data is available to determine head orientation. If facial features are detected or sensor data is available, execution moves to vertical line 1714. If facial features are not detected or sensor data is not available, execution may pause at detect 1712 until facial features or sensor data is detected.

Execution of vertical line 1714 determines whether the facial features and/or sensor data detected are sufficient to determine a vertical Centerline (e.g., 220). If the detected features and/or data are sufficient, execution moves to determine 1716. If insufficient, execution moves to horizontal line 1720.

Execution of determine 1716 determines the horizontal field of view based on the detected vertical Centerline (e.g., 220). The horizontal field of view may be determined by adding (e.g., summing) angle 1410 to angle 1412 formed between the vertical line (e.g., line 220) and edge of vision of the eyes as shown in FIG. 14. Angle 1410 and angle 1412 may be for an average human or as measured for a specifically identified user. Execution moves to indicate 1718.

Execution of indicate 1718 creates and/or stores data so that the horizontal field of view as calculated may be shown (e.g., indicated, presented) on or with respect to the captured data, whether the captured data is from a single capture system or aligned data from two or more captures systems. Execution moves to horizontal line 1720.

Execution of horizontal line 1720 determines whether the facial features detected or sensor data are sufficient to detect a horizontal Centerline (e.g., 320). If the facial features or sensor data are sufficient to detect a horizontal Centerline, execution moves to determine 1722. If insufficient, execution moves to end 1726.

Figure 15:
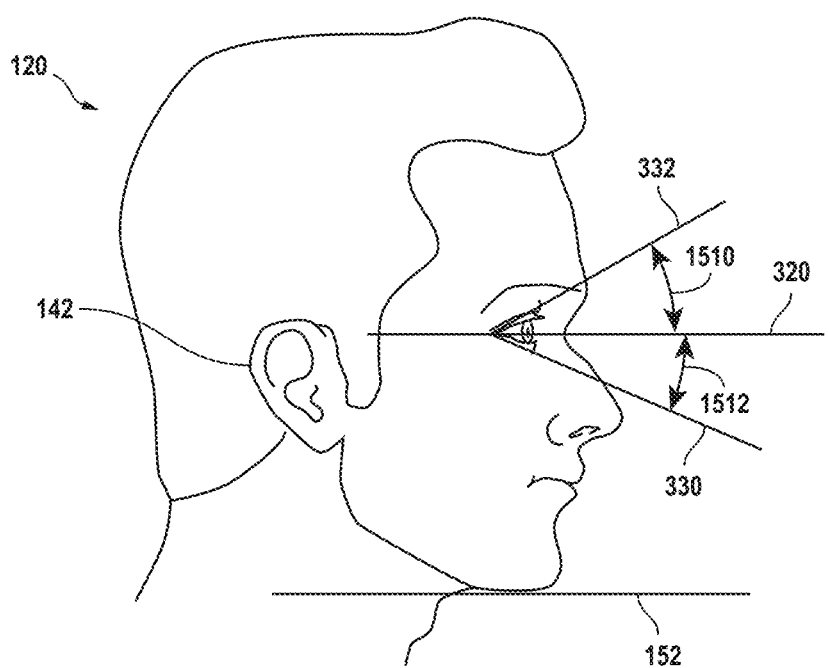
FIG. 15 is a diagram of relationships between facial features and a person's vertical field of view.

Execution of determine 1722 determines the vertical field of view based on the detected horizontal Centerline. The vertical field of view may be determined from adding angles 1510 and 1512 as shown in FIG. 15. Angles 1510 and 1512 may be for an average human or as measured for a specifically identified user. Execution moves to indicate 1724.

Execution of indicate 1724 creates and/or stores data so that the vertical field of view as calculated may be shown on or with respect to captured data, whether the captured data is from a single capture system or aligned data from two or more captures systems. Execution moves to end 1726.

A system, such as system 1800, may be used to capture audiovisual data at the scene of an incident, store the data, align the audiovisual data captured by the various capture systems, determine a field of view of a person from captured data, and present (e.g., display, identify) the field of view of the person with respect to the captured data from the one or more capture systems. A field of view may be presented as a boundary shown (e.g., drawn, indicated) on captured. A field of view may be shown with respect to captured data as the captured data is replayed for viewing.

System 1800 includes server 1810, network 1890 and capture systems 1812, 1822, and 1872. Server 1810 includes engines and computer-readable mediums which operate to store and align capture data from capture systems 1812, 1822, and 1872. Server 1810 further includes engines and computer-readable mediums to store and determine (e.g., calculate) field of view information for people that appear in the capture data and/or for people who were wearing sensors at the scene during capture. Server 1810 may further include engines and computer-readable mediums for preparing and providing data so that a person's field of view may be shown with respect to captured data from one or more capture systems during playback.

Capture systems 1812, 1822, and 1872 may communicate with server 1810 via communication circuit 1880 and network 1890. A capture system may communicate with a server to provide captured data to the server. Data from capture systems may be stored in captured data computer-readable medium 1850. Data from a capture system may include information as to the camera that captured the data, the operator of the camera, the incident where the recorded data was captured, the date of capture, and any information (e.g., time-stamps) that may enable alignment of the data of one capture system to the data of one or more other capture systems. Data from capture systems may include data from sensors that detect the orientation of a user's head.

The term "engine" as used herein refers to, in general, circuitry, logic embodied in hardware and/or software instructions executable by a processor of a computing device. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA™, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

Alignment engine 1840 and alignment computer-readable medium 1860 align capture data from one capture system with the capture data of one or more other capture systems. Any technique for aligning (e.g., combining, overlaying) capture data from one capture system with the capture data of one or more other capture systems may be used. Visual alignment, which includes analysis of the visual information in the captured data may be compared from one capture system to the visual information of another capture system to determine which portions of a scene are common to both captured data sets. Alignment in time may be accomplished using time-stamps or any other temporal alignment method. Capture data from different capture systems may be aligned to create aligned data that includes all or a portion of the captured data from each capture system. Aligned data may have a field of capture that is greater than the field of capture of any one of the capture systems. Aligned data may be stored in alignment computer-readable medium 1860.

Field of view engine 1820 and field of view computer-readable medium 1870 may be used to identify people in the captured data from one or more capture system, identify the same person in the captured data from different capture systems, detect facial features of a person identified in the captured data, detect data from sensors used to report the orientation of a user's head, determine the field of view of one or more of the peopled identified in captured data, and/or determine the overlap of the field of view of a person with the captured data from one or more capture systems separately or after alignment. Field of view computer-readable medium 1870 may store the calculated fields of view, so that the field of view of one or more people identified in the captured data maybe shown with respect to the captured data.

Presentation engine 1830 may use captured data from captured data computer-readable medium 1850 and/or aligned data from alignment computer-readable medium 1860 to present a view of an event. Presentation engine 1830 may further use field of view information from field of view computer-readable medium 1870 to identify and/or show the field of view of an individual in the presentation. Presentation engine 1830 may provide a presentation of an event from the field of view of one or more individuals.

As discussed above, the field of view of a person may be represented by a geometric shape. The geometric shape of the field of view may be superimposed over captured data and/or aligned data so that the portion of the captured and/or aligned data seen by the person may be identified. A field of view may further be identified by obscuring, completely or partially, audiovisual data that falls outside of the field of view.

In the event that two or more people are present at the incident, the field of view of the two or more people may be determined and the field of view of each person may presented with respect to the captured data. Each field of view may be uniquely identified in some way (e.g., color, line style) so that the field of view of the two or more people may be presented at the same time on the captured and/or aligned data.

As discussed above, the field of view of a user may be overlaid or displayed with respect to composite video data from two or more capture systems. Method 1900 is an implementation of a method for aligning video data from multiple capture systems and identifying an officer's field of view with respect to the resulting composite image. Alignment engine 1840 and presentation engine 1830 may cooperate to perform method 1900.

Method 1900 includes blocks identified as start 1910, identify 1912, indicate 1914, align 1916, check 1918, next 1920, field of view 1922, present 1924, and end 1926.

Execution begins at start 1910.

Execution of identify 1912 identifies the field of view of an officer in a first capture data. The officer's facial features (e.g., eyes, jawline, ears, and nose) or sensor data may be identified from the captured data. The field of view may be determined as discussed above. After calculating the field of view, execution moves to indicate 1914.

Execution of indicate 1914 indicates (e.g., identifies, shows, highlights) the field of view in a first capture data. The first capture data may be selected due to optimal identification of the officer facial features or sensor data related to the first capture data. Execution moves to align 1916.

Execution of align 1916 aligns the first capture data to a next capture data. Features (e.g., cars, trees, people, buildings, and colors) which are present in both the first and next capture data may be used to align the two data. For example, an officer's car may be identifiable from different angles in the first and next capture data. By aligning common features, the next capture data may be correctly aligned to the first capture data. After alignment, execution moves to check 1918.

Execution of check 1918 determines whether all capture data is aligned to the first capture data. If capture data from all capture systems is not aligned, execution moves to next 1920 where the next capture data is selected. Then execution returns to align 1916 where the specified capture data is aligned. If all data are already aligned, execution moves to field of view 1922.

Execution of field of view 1922 indicates the field of view in each capture data in accordance with the calculated field of view of first capture data and alignment information. Execution moves to present 1924.

Execution of present 1924 presents the field of view in each data set. The field of view may be presented on the combined capture data from the capture systems. Execution moves to end 1926.

Other implementations may include the following.

A system for determining a field of view of a person in captured data, the system comprising: a processor; and a computer-readable medium; wherein the processor: detects one or more facial features of a person in video data, the video data from one or more capture systems, the video data stored in the computer-readable medium; determines a field of view of the person in accordance with the facial features with respect to the captured data; and determines data that shows the field of view of the person in a presentation of the captured data.

A method performed by a processor for determining a field of view of a person in captured data, the method comprising: receiving captured data; detecting one or more facial features of a person recorded in the captured data; in accordance with the facial features, determining a field of view of the person with respect to the captured data; and determining data that shows the field of view of the person in a presentation of the captured data.

The foregoing description discusses embodiments, which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other words that refer to a location, whether specific or general, in the specification shall be construed to refer to any location in the specification whether the location is before or after the location indicator.

What is claimed is:

1. A method for identifying a field of view of a person, the method comprising:
   capturing, by a camera system coupled to a support worn by the person, video data comprising a field of capture that is greater than the field of view of the person;

capturing, by one or more sensors of the camera system, sensor data corresponding to an orientation of a head of the person;

transmitting, by the camera system to a server via a network, the video data and the sensor data;

receiving, by the server, the video data and the sensor data;

determining, by the server, the field of view of the person in accordance with the sensor data and limits of the person's vision, wherein portions of the field of capture of the video data outside the field of view of the person were not visible to the person at moments of time at which the video data was captured;

indicating, by the server, the field of view of the person on the video data as a portion of the field of capture of the video data; and displaying, via a user interface of an electronic device, the video data on which the field of view of the person is indicated, wherein displaying the video data comprises presenting the field of capture of the video data and visually indicating the field of view of the person relative to the field of capture of the video data in the displayed video data.

2. The method of claim 1 wherein determining the field of view of the person further includes determining a range of the field of view of the person in accordance with at least one of the person and a situation.

3. The method of claim 1 wherein indicating the field of view of the person on the video data comprises one of:
   superimposing a boundary over the field of view of the person; and
   obscuring a second portion of the field of capture of the video data that falls outside of the field of view of the person.

4. The method of claim 1 wherein indicating the field of view of the person on the video data comprises each of:
   superimposing a boundary over the field of view of the person; and
   obscuring a second portion of the field of capture of the video data that falls outside of the field of view of the person.

5. The method of claim 4 wherein obscuring the second portion of the field of capture of the video data comprises at least one of:
   darkening the portions of the field of capture of the video data outside the field of view of the person; and
   marking out of focus the portions of the field of capture of the video data outside the field of view of the person.

6. The method of claim 1 further comprising detecting, by the server, a facial anatomy of the person recorded in the video data, wherein determining the field of view of the person further comprises determining the field of view of the person in accordance with the facial anatomy of the person recorded in the video data.

7. The method of claim 1, wherein the one or more sensors comprise a directional microphone, a magnet, a laser, or a strain gauge.

8. The method of claim 1, wherein determining the field of view of the person comprises calculating at least one of a horizontal field of view of the person and a vertical field of view of the person.

9. The method of claim 1, further comprising:
   receiving, by the server, second video data from a second capture system;
   aligning, by the server, the second video data with the video data; and
   indicating, by the server, the field of view of the person on the second video data as a portion of a second field of capture of the second video data.

10. A system for identifying a field of view of a person, the system comprising:
    a support configured to be worn by the person;
    one or more sensors configured to capture sensor data corresponding to an orientation of a head of the person;
    a capture system comprising one or more cameras coupled to the support, wherein the one or more cameras of the capture system capture video data comprising a field of capture greater than the field of view of the person and wherein the capture system is configured to transmit, via a network, the video data to a server separate from the capture system; and
    the server; wherein the server is configured to perform operations comprising:
       receiving the video data;
       calculating the field of view of the person in accordance with limits of vision of the person, wherein portions of the field of capture of the video data outside the field of view of the person were not visible to the person at moments of time at which the video data was captured;
       and
       providing a presentation of the field of capture of the video data, wherein the presentation visually identifies the field of view of the person on the video data as a portion of the field of capture of the video data in accordance with the calculated field of view of the person, wherein the field of view is visually identified with respect to the field of capture of the video data during playback of the video data, and wherein the presentation is provided for display via a user interface of an electronic device.

11. The system of claim 10, wherein the operations further comprise detecting a facial anatomy of the person recorded in the video data, and wherein calculating the field of view of the person comprises calculating the field of view of the person in accordance with the detected facial anatomy of the person.

12. The system of claim 10 wherein calculating the field of view of the person includes measuring a specific field of view of the person.

13. The system of claim 10 wherein calculating the field of view of the person includes narrowing a range of the field of view of the person in accordance with a stressful situation the person was under during capture of the video data.

14. The system of claim 10 wherein the support is configured to rest on at least one of the neck and shoulders of the person.

15. The system of claim 10 wherein the field of capture is oriented in a forward direction relative to the person.

16. The system of claim 10 wherein providing the presentation comprises each of:
    superimposing a boundary over the field of view of the person; and
    obscuring a second portion of the field of capture of the video data that falls outside of the field of view of the person.

17. The system of claim 16 wherein obscuring the second portion of the field of capture of the video data that falls outside of the field of view of the person comprises at least one of:
    darkening the second portion of the field of capture; and
    making out of focus the second portion of the field of capture.

18. The system of claim 10 wherein:

the capture system comprises a processor coupled to the support; and the processor is configured to determine the orientation of the head of the person, wherein the calculating the field of view comprises calculating the field of view of the person in accordance with the orientation of the head of the person.

19. The system of claim 18 wherein:

the one or more sensors comprise a directional microphone, a magnet, a laser, or a strain gauge; and the orientation of the head of the person is calculated in accordance with information detected by the directional microphone, the magnet, the laser, or the strain gauge.

20. The system of claim 10 wherein the capture system comprises a shoulder-mounted capture system and the field of capture comprises a 360-degree field of capture.

\* \* \* \* \*